United States Patent
Hamaguchi

(10) Patent No.: US 9,271,482 B2
(45) Date of Patent: Mar. 1, 2016

(54) FISH SHAPED LURE FOR TROLLING

(71) Applicant: Kabushiki Kaisha HOPEC, Ise-shi, Mie-ken (JP)

(72) Inventor: Yukio Hamaguchi, Ise (JP)

(73) Assignee: Kabushiki Kaisha Hopec, Mie-Ken (JP)

( * ) Notice: Subject to any disclaimer, the term of this patent is extended or adjusted under 35 U.S.C. 154(b) by 77 days.

(21) Appl. No.: 14/081,238

(22) Filed: Nov. 15, 2013

(65) Prior Publication Data

US 2014/0360088 A1 Dec. 11, 2014

(30) Foreign Application Priority Data

Jun. 7, 2013 (JP) ................................ 2013-121047

(51) Int. Cl.
| | |
|---|---|
| *A01K 85/00* | (2006.01) |
| *A01K 85/16* | (2006.01) |
| *A01K 85/01* | (2006.01) |
| *A01K 91/053* | (2006.01) |
| *A01K 91/18* | (2006.01) |

(52) U.S. Cl.
CPC .................. *A01K 85/16* (2013.01); *A01K 85/00* (2013.01); *A01K 85/01* (2013.01); *A01K 91/053* (2013.01); *A01K 91/18* (2013.01)

(58) Field of Classification Search
CPC ..... A01K 85/00; A01K 85/005; A01K 85/01; A01K 85/18
USPC ............. 43/42.24, 42.33, 42.35, 42.36, 42.39
See application file for complete search history.

(56) References Cited

U.S. PATENT DOCUMENTS

| | | | | |
|---|---|---|---|---|
| 3,844,060 | A | * 10/1974 | Kurachi | 43/41 |
| 4,020,580 | A | * 5/1977 | Chappell et al. | 43/17.5 |
| 4,307,531 | A | * 12/1981 | Honse | 43/42.32 |
| 4,803,793 | A | * 2/1989 | Schellenberg, III | 43/42.33 |
| 4,841,664 | A | * 6/1989 | Baldwin | 43/41 |
| 5,172,510 | A | * 12/1992 | Lovell, Jr. | 43/42.36 |
| 6,105,304 | A | * 8/2000 | Wicklund | 43/42.25 |
| 6,658,785 | B1 | * 12/2003 | Faulkner et al. | 43/44.2 |
| 7,174,669 | B1 | * 2/2007 | Kallas | 43/42.06 |
| 2008/0263936 | A1 | * 10/2008 | Su | 43/42.53 |

FOREIGN PATENT DOCUMENTS

| | | |
|---|---|---|
| JP | 33-7266 | 5/1933 |
| JP | 60-114662 | 8/1985 |
| JP | 62-198969 | 12/1987 |
| JP | 2530520 | 12/1996 |
| JP | 10-127208 | 5/1998 |
| JP | 10-127209 | 5/1998 |
| JP | 11-123037 | 5/1999 |
| JP | 2000-032876 | 2/2000 |

(Continued)

*Primary Examiner* — David Parsley
*Assistant Examiner* — Morgan T Barlow
(74) *Attorney, Agent, or Firm* — Jordan and Hamburg LLP

(57) ABSTRACT

Transfer sheets on which an image quite closely resembling an external appearance of a bait fish is color printed on the surface of a hologram sheet are adhered to back sides of bilaterally symmetrical body-half segments made of a flexible transparent thermoplastic resin in a state that the image can be viewed perspectively from the surface side. Only front head sides which occupy at least half in both the body-half segments are adhered and remaining rear end sides are kept open, by which a line equipped with a hook is guided out and wired to the front from the rear end sides via an interior hollow of a lure body.

11 Claims, 44 Drawing Sheets

(56) References Cited

FOREIGN PATENT DOCUMENTS

| JP | 2000-125702 | 5/2000 |
|----|-------------|--------|
| JP | 2000-271956 | 10/2000 |
| JP | 2001-238571 | 9/2001 |
| JP | 2002-034391 | 2/2002 |
| JP | 2003-038065 | 2/2003 |
| JP | 2006-87410 | 4/2006 |
| JP | 4225395 | 12/2008 |
| JP | 2009-178041 | 8/2009 |
| JP | 2009-278953 | 12/2009 |

* cited by examiner

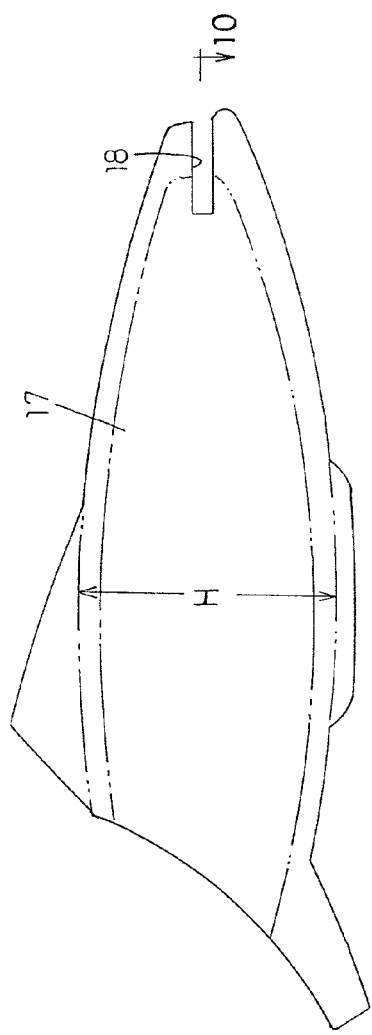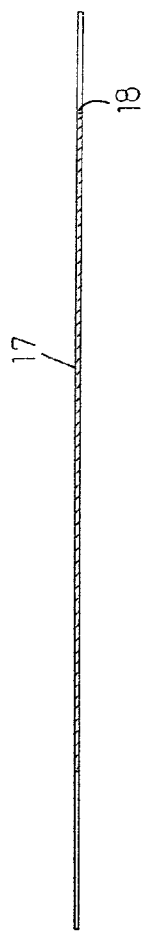

FISH SHAPED LURE FOR TROLLING

BACKGROUND OF THE INVENTION

The present invention relates to a fish shaped lure for trolling (artificial bait) used in luring various species of large-size migrant fish such as tuna, marlin, mahi-mahi (commonly called dolphin fish) and bonito to the surface of the water (surface layer) and making them bite the lure.

Japanese Published Unexamined Patent Application No. 2009-278953 has disclosed what is called a soft lure mainly used for ocean-going long line tuna fishing by fishermen.

In the above described lure for professional use, a basic configuration thereof is considered to be the publicly known technology which is closest to the present invention on points that the lure is molded with a flexible synthetic resin into a fish shape having a cavity inside, the cavity on the side of a caudal fin in the fish shape is formed as an opening part, and a hook is attached to a line inserted on the side of the opening part in the cavity.

On the other hand, apart from the lure which is used for long-line fishing (professional use) by fishermen disclosed in the above Japanese Published Unexamined Patent Application No. 2009-278953, Japanese Patent No. 4225395 discloses a lure for pole-and-line fishing used on a beach or a boat by general anglers in which a main body of the fish shaped lure (body) is injection-molded with a soft resin or molded into a transparent or translucent body, Japanese Published Unexamined Patent Application No. H10-127209 and Japanese Published Unexamined Patent Application No. 2002-34391 have disclosed that transparent or translucent hemi segments (body halves) are jointed to make a hollow fish shaped lure main body, and Japanese Published Unexamined Patent Application No. H10-127208 discloses the surface of a lure main body is made irregular to give hologram processing to convex scale pieces thereof, or a scale piece-like seal to which hologram processing has been given is adhered to a flat surface of the lure main body.

However, since the lure disclosed in Japanese Unexamined Patent Application Publication No. 2009-278953 is merely a lure for long-line fishing which is exclusively used by fishermen, a lure (1) has to be sunk down into the sea by a conically-shaped weight (8) attached and fixed to a line (6) via a clamp (9). Therefore, the weight (8) is necessary for keeping the lure (1) in a state so as not to float on the surface of the water (surface layer).

A smell containing member (10) such as a sponge is provided internally between the weight (8) the line (6) of which inserted into a cavity part (la) of the lure (1) and a hook (7), and seawater containing the smell of live bait is scattered little by little into the sea during fishing operation, thereby effectively gathering fish. For this reason, it is necessary to sink the lure (1) in the sea.

Further, the lure disclosed in Japanese Unexamined Patent Application Publication No. 2009-278953 is a soft lure made of a flexible synthetic resin. A main body thereof is molded in its entirety in a continuously integrated manner from a head to a caudal fin part of a fish shape. Therefore, there is no other way than to paint the surface thereof (outer circumferential face) to achieve coloring as the same status as that of bait fish (live fish) for fish to be caught, thus resulting in poor weather resistance and wear resistance.

In a soft lure disclosed in Japanese Patent No. 4225395, a lure main body (2) thereof is also molded with a soft resin in an integrated manner and baiting ingredients of a baiting body (3) installed therein flows into the water via a part exposed from the lure main body (2), thereby gathering fish. In this sense as well, the soft lure is essentially not different from the lure disclosed in Japanese Published Unexamined Patent Application No. 2009-278953 as a lure for bass fishing at a lake and used in a state that the lure sinks into the water.

Further, the soft lure disclosed in Japanese Patent No. 4225395 is made of a soft resin and used, with no cavity provided (in a state that the strength is kept), by filling baiting body (3) containing baiting ingredients made of a soft resin into a lure main body (2) so as not to fall down thereinside and, therefore, designed not to be detached from a hook (5).

Next, the lure body (1) disclosed in Japanese Unexamined Patent Application Publication No. H10-127209 is considered to be a hard plastic product and unable to exhibit realistic movement of a bait fish in a usage state of being sunk into the water, although it is hollow, not only a reflection board (3) made of metal, plastic or paper but also a line eye (5) for tying a line and a hook hanger (6) or an eye bolt (7) for attaching a hook are installed at a part where body halves (hemi segments) (2), (2) are jointed to each other.

Further, colors or patterns imparted by surface processing of the lure body (1) itself are synergistically influenced by the reflection board (3) which reflects upon receipt of light to obtain fish gathering effects. However, the reflection board (3) is molded into a board by using metal, plastic or paper and also placed inside the lure body (1) along a central part thereof. Thus, even laser processing, plating, metal vapor deposition or painting are performed on the surface of the reflection board (3), the lure body (1) itself becomes what is called a rigid state and therefore, elastic deformation such that a bait fish bends its body or realizes movement such as the bait fish allows a caudal fin to sway laterally cannot be expected.

The lure main body (1) disclosed in Japanese Unexamined Patent Application Publication No. 2002-34391 is also a hard synthetic resin product used in a state that it is sunk into the water.

The lure main body (1) is constituted in such a manner that a light-reflecting surface sheet (S1) which is adhered to the surface of the lure main body (1) and a light-reflecting inner sheet (S2) which is adhered to both sides of a board (10) at a central part inside the lure main body (1) are used to emit reflection light effective in gathering fish. Even in this configuration, as with the lure disclosed in Japanese Published Unexamined Patent Application No. H10-127209, the lure main body (1) is unable to undergo elastic deformation or realize swaying movement like a bait fish due to the fact that the board (10) is made of metal or a synthetic resin. Therefore, fish gathering effects of the lure main body is not expected.

Further, the lure body (1) disclosed in Japanese Published Unexamined Patent Application No. H10-127208 is even hollow by jointing a pair of body halves (hemi segments). The lure body (1) is, however, considered to be a hard plastic product which is used by being sunk into the water because it is provided with a hook hanger (2) for attaching a front hook (4) and an eye bolt (3) for attaching a rear hook (5).

Moreover, the convex scale pieces (10) to which hologram processing (12) has been performed are formed on the surface of the lure body (1), while the scale piece-like seal (20) to which hologram processing (12) has been performed is adhered to a flat surface of the lure body (1). Therefore, they are inferior in weather resistance and wear resistance and unable to undergo elastic deformation or realize swaying movement like a bait fish either, thus making it impossible to provide fish gathering effects.

In brief, fish shaped lure for trolling which closely resembles a bait fish for fish to be caught has not been developed in terms of design of the lure main body (external appearance), hardness (quality and texture of material) and movement. The above described fish shaped lure is not yet commercially available.

SUMMARY OF THE INVENTION

An object of the present invention is to solve the above described problems. In order to achieve the object, the present invention in the main aspect provides a fish shaped lure comprising a pair of bilaterally symmetrical body-half segments molded into the configuration of a bait fish for fish to be caught by using a flexible transparent or translucent thermoplastic resin and a pair of symmetrical transfer sheets in which an image identical or similar to an external appearance of the bait fish is color-printed on a hologram forming face of a hologram sheet which is substantially similar to each of the body-half segments in terms of dimension and configuration, in which the pair of corresponding transfer sheets are adhered to the back sides of the body-half segments to give an integrated body by using a colorless organic solvent or an adhesive agent in such a relationship that the image thereof can be viewed perspectively in a mixed state with a hologram image from the surface side of each of the body-half segments, while only front head sides of both the body-half segments which occupy at least half a fish shape are adhered in a bordered state by fusion of plasticizers used therein or by using the colorless organic solvent or the adhesive agent and assembled into a hollow lure body having a substantially oval cross section, rear end sides of both the body-half segments which occupy at most half the remaining fish shape are not adhered but kept open, and a line to which a hook has been integrally attached in advance to the leading end thereof is inserted from the rear end sides of the lure body which are kept open and guided out and wired in a mouth part of the front head sides, thereby the lure body is set so as to move along the line in a back and forth direction.

Further provided by a second aspect of the invention is an aforementioned fish shaped lure in which a shape retaining core film which is uniform in thickness and molded with a flexible thermoplastic resin so as to be substantially similar in dimension and configuration to the front head sides of both the body-half segments which occupy at least half the fish shape is set so as to be inserted between only the front head sides of both the body-half segments which occupy at least half the fish shape, by which both the body-half segments are adhered to the shape retaining core film to give an integrated body in a bordered state by fusion of plasticizers used therein.

Yet further provided by a third aspect of the present invention is an aforementioned fish shaped lure in which a mouth part shape retaining core tube is molded with a high-strength thermoplastic resin into a tapered trapezoidal shape when viewed laterally and having a substantially oval cross section so as to be inserted and fitted near the mouth part of the fish shape in both the body-half segments, and the thus molded mouth part shape retaining core tube is inserted and set only near the mouth part of the fish shape in both the body-half segments, thereby both the body-half segments are adhered to give an integrated body in a bordered state by using the colorless organic solvent or the adhesive agent.

Also provided, by a fourth aspect of the present invention is an aforementioned fish shaped lure in which both the body-half segments which are to be assembled into a lure body are molded so that mutually facing cross sections are made substantially semi-oval, while a distance from the mouth part of the fish shape to the vicinity of a rear end of a dorsal fin part is given as a dorsal joint face which forms a border continuously along the edge of a dorsal face, a distance from the mouth part of the fish shape to the vicinity of an intermediate site of a ventral fin part or a distance from the mouth part of the fish shape to the vicinity of an intermediate site of an anal fin part is given as a ventral joint face which forms a border continuously along the edge of a ventral face, and the dorsal joint faces and the ventral joint faces of both the body-half segments are adhered to give an integrated body by using the colorless organic solvent or the adhesive agent so as to give a state that both faces are attached face to face or adhered to give an integrated body via a shape retaining core film made of a soft vinyl chloride resin by fusion of plasticizers used therein.

Also provided by a fifth aspect of the present invention is an aforementioned fish shaped lure in which the front head sides where the body-half segments of the lure body are adhered in a bordered state are made greater in average thickness, and the rear end sides where they are not adhered but kept open are made thinner in average thickness, thereby giving a difference in average thickness between them.

Also provided, by a sixth aspect of the present invention is an aforementioned fish shaped lure in which the hologram sheet of each of the transfer sheets is given as a laminated body made of a paper substrate sheet, a hologram forming resin sheet and a metal reflection layer which is fused or vapor-deposited on a hologram forming face thereof, thereby color-printing a realistic image of a bait fish on the surface of the metal reflection layer by offset printing, and after the transfer sheets have been adhered to the back sides of the body-half segments to give an integrated body but before assembly of the body-half segments into the lure body, only the paper substrate sheet of the hologram sheet of the transfer sheet is removed.

To produce a fish shaped lure of the invention, an image identical or similar to an external appearance of the bait fish is color-printed on the hologram forming face of the hologram sheet which constitutes the transfer sheet. In Japanese Japanese Published Unexamined Patent Application No. H10-127209, Japanese Published Unexamined Patent Application No. 2002-34391 or Japanese Published Unexamined Patent Application No. H10-127208, color-painting is given directly to a three-dimensional surf ace of the lure body, the light reflective sheet is adhered to the lure body, or the lure body is processed so as to be irregular. However, in the present invention, the image can be printed on a flat sheet without any restriction at high accuracy, thereby providing such effects that a manufacturer is able to abundantly supply fish shaped lures of various images.

Next, the transfer sheet having the above described image is adhered to the back sides (inner faces) of the transparent or translucent body-half segments configured to be a bait fish, and both the body-half segments after the transfer sheet has been adhered are assembled into a hollow lure body to be a substantially oval cross section. Therefore, the image on the transfer sheet is kept covered from the surface side (outside) by the lure body and free of any fear that it is stained or peeled off accidentally.

Further, the image of the transfer sheet is viewed perspectively and observed from the surface side (outside) of the lure body in a mixed state with a hologram image. Thus, the image is able to give an impression of actions that scales of the bait fish glisten and shimmer together with functions of light diffusion, scattering, reflection and diffraction of the hologram image. This is quite effective in gathering fish to be caught.

Moreover, both the body-half segments of the lure body are molded with a flexible thermoplastic resin, and only the front head sides which occupy at least half the entire fish shape are adhered integrally but the rear end sides which occupy at most half the remaining fish shape are not adhered but kept open. Therefore, the lure body is able to promote deformation as if a bait fish bends its body and smooth swaying movement of the rear end side at which the caudal fin part is present, thereby providing realistic actions which mimic the bait fish.

At the time when a fish to be caught bites the lure body, the lure body moves along the line in a back and forth direction, and the hook attached to the front end of the line is drawn away from the lure body (in a hook dropped state), which is also effective in giving no resistance or sense of discomfort to the fish to be caught.

In this case, if the configuration described for the second aspect of the invention is adopted, the hollow lure body which is assembled to be a substantially oval cross section is prevented from being made flat naturally by allowing the lure body to stand erect from the inside hollow with the use of the shape retaining core film. Therefore, the lure body can be appropriately adjusted for its thickness (waistline), depending on a bait fish.

Further, since the lure body is able to undergo elastic deformation like a bait fish bending its body, it can be effectively used as a realistic fish shaped lure which closely resembles a bait fish in terms of an external appearance (design), hardness/softness and behavior.

Next, via the shape retaining core film, both the body-half segments are adhered in a bordered state, by which they are firmly fixed in an integrated manner naturally with lapse of time due to fusion of plasticizers used therein. Thus, there is eliminated a necessity for using a special organic solvent or adhesive agent and both the body-half segments can be assembled into the lure body easily and quickly.

On the other hand, if the configuration described for the third aspect of the present invention is adopted, the lure body is such that only the front head sides which occupy at least half the fish shape are adhered, and the rear end sides which occupy at most half the remaining fish shape are not adhered but kept open. However, the mouth part shape retaining core tube made of a high-strength thermoplastic resin is independently inserted near the mouth part of the lure body and set in an assembled state. Therefore, in addition to being flexible so as not to give resistance or sense of discomfort to fish to be caught, the lure body is not only able to disperse tensile stress which is concentrated at the mouth part of the lure body when the fish to be caught bites but is also effective in improving the endurance and strength.

Further, if the configuration described for the fourth aspect of present invention is adopted, the lure body can be adhered stably and accurately from both body-half segments which are substantially oval on the mutually facing cross sections so that the dorsal joint faces and the ventral joint faces of the fish shape are adhered in such a state as to adhere continuously along the edge. In particular, where the lure body is constituted so as to adhere via the shape retaining core film which is made of a soft vinyl chloride resin, the lure body can adhere quite simply just by being pressed (sandwiched) without any special organic solvent or adhesive agent due to the fact that the plasticizers used therein are fused and hardened over time, thereby contributing to further improvement in convenience and productivity.

If the configuration described for the fifth aspect of the invention is adopted, the lure body is constituted in such a manner that only the front head sides which are molded with a flexible thermoplastic resin and occupy at least half the fish shape are adhered in a bordered state, and the rear end sides which occupy at most half the remaining fish shape are kept open, thereby the lure body undergoes elastic deformation as if a bait fish bends its body and realizes opening/closing movement as if the bait fish allows the caudal fin part to sway smoothly in the lateral direction. This is effective in making an impression that the lure body mimics real movement of the bait fish.

Moreover, if the configuration described for the sixth aspect of the invention is adopted, an image of the transfer sheet can be viewed perspectively and observed in a mixed state with a hologram image from the surface side (outside) of the transparent or translucent lure body. Metallic luster reflecting from a metal reflection layer and others also work in a synergistic manner, thereby giving an impression that scales of the bait fish glisten and shimmer to provide excellent fish gathering effects.

In this case, after the transfer sheets have been adhered to the back sides (inner faces) of the body-half segments but before both the body-half segments are assembled into the lure body, only the paper substrate sheet (adhered board) of the hologram sheet of the transfer sheet is removed, which will not adversely influence the flexibility of both the body-half segments. Also, there is no fear of disturbing elastic deformation of the lure body or swaying movement of the caudal fin part.

BRIEF DESCRIPTION OF THE DRAWINGS

FIG. 9 is a side view which shows that a shape retaining core film is extracted.

FIG. 10 is a sectional view taken along the line 10 to 10 in FIG. 9.

DETAILED DESCRIPTION OF THE INVENTION

Hereinafter, a detailed description will be given of a specific configuration of the present invention with reference to the drawings. FIG. 1 to FIG. 35 show a preferred first embodiment of the present invention, showing a assemble state of a fish shaped lure (A) appropriately used in trolling for tuna (fish to be caught) and also configuration members thereof (a disassembled state).

Figure 7:
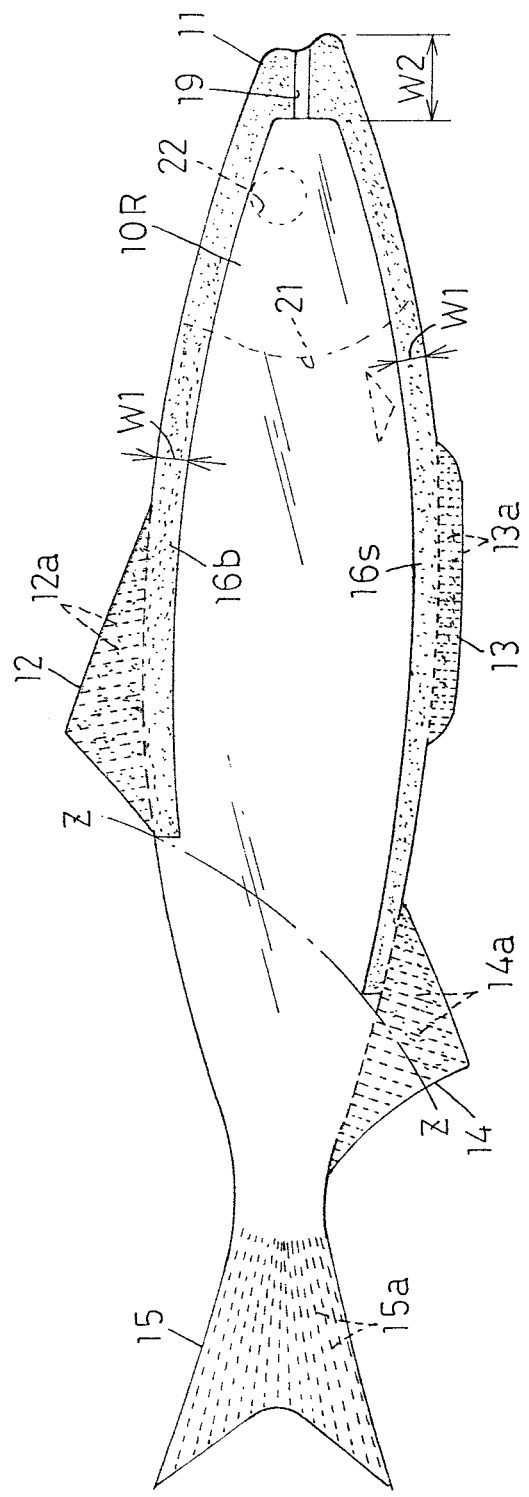
FIG. 7 is a side view which shows that a right-side body-half segment in FIG. 1 is extracted.
Figure 8:
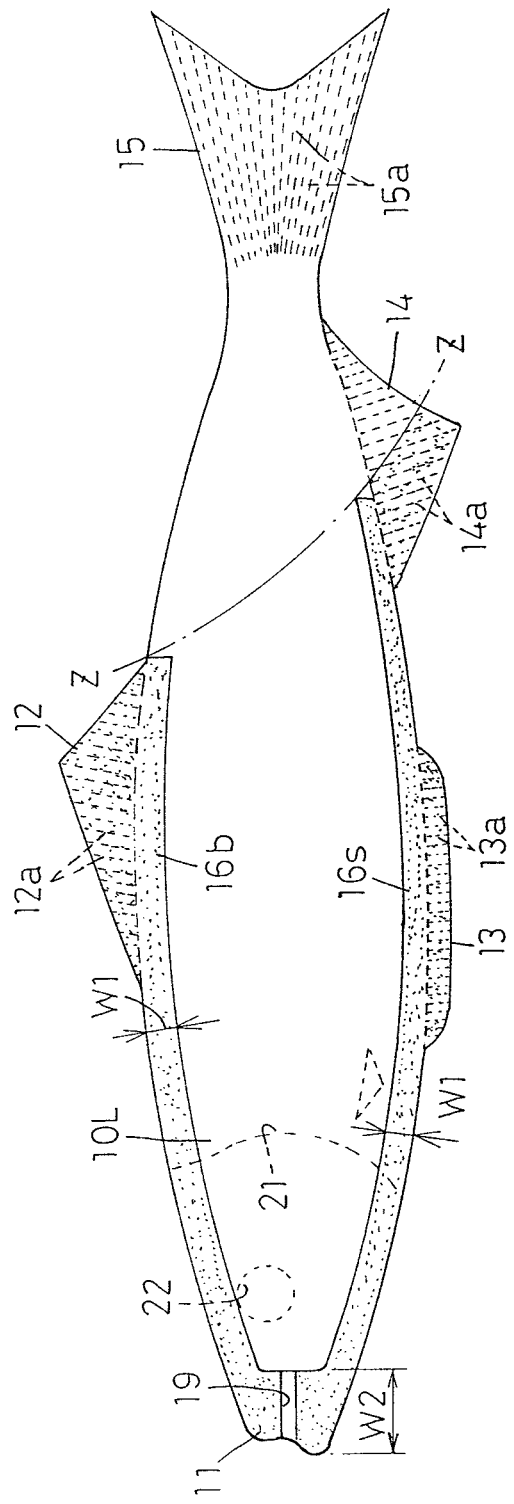
FIG. 8 is a side view which shows that a left-side body-half segment in FIG. 1 is extracted.

Reference numerals (10L), (10R) indicate a pair of body-half segments (hemi segments of the body) which forms a hollow lure body (10). Each of the body-half segments is injection-molded from a flexible transparent or translucent thermoplastic resin into a bilaterally symmetrical configuration in general which includes a mouth part (11), a dorsal fin part (12), a ventral fin part (13), an anal fin part (14) and a caudal fin part (15) in a fish shape as shown in FIG. 7 and FIG. 8, and mutually facing cross sections are made substantially semi-oval. For a configuration, there is an exemplified configuration (streamline) of a sardine (bait fish) taken by the above described tuna.

The thermoplastic resin of the body-half segments (10L), (10R) may include polystyrene, acrylic resin, polyvinyl acetal, vinyl acetate resin, AS resin, ABS resin and polypropylene. Preferable is a resin which does not absorb water in particular and has excellent weather resistance, and most preferable is acrylic resin. A polyvinylchloride resin absorbs water and becomes clouded, thereby giving an impression of an external appearance of a dead fish. This resin is, therefore, not preferable for the lure body (10) of the present invention.

A reference numeral (16b) indicates a flat dorsal joint face which forms a border continuously along the edge of a dorsal face in a distance from the mouth part (11) to the vicinity of a rear end at the dorsal fin part (12) of each of the body-half segments (10L) (10R) in the fish shape. A reference numeral (16s) also indicates a flat ventral joint face which forms a border continuously along the edge of a ventral face in a distance from the mouth part (11) to the vicinity of an intermediate site at the anal fin part (14) of each of the body-half segments (10L) (10R) in the fish shape. And, the dorsal joint faces (16b) and the ventral joint faces (16s) of both the body-half segments (10L) (10R) are adhered integrally via a shape retaining core film (17) which is installed independently.

That is, the shape retaining core film (17) is a flat film which is uniform in thickness (for example, about 0.5 mm) and made of a thermoplastic resin that abundantly contains a plasticizer, preferably made of a transparent or translucent soft vinyl chloride resin. As shown by extraction in FIG. 9 and FIG. 10, the shape retaining core film (17) is molded so as to be similar in dimension (occupied area) and configuration to a front head side from a virtual line (Z-Z) which connects the vicinity of a rear end at the dorsal fin part (12) with the vicinity of the intermediate site at the anal fin part (14) in each of the body-half segments (10L) (10R). A long narrow line release notch (18) which is formed in a U-letter shape when viewed laterally is provided at a position corresponding to the mouth part (11) of each of the body-half segments (10L) (10R).

Next, as apparent from FIG. 1 to FIG. 5, the shape retaining core film (17) having the above described dimension (occupied area) and the configuration is provided between the front head sides from the virtual line (Z-Z) in the body-half segments (10L) (10R) in a bordered state correctly in alignment, and the dorsal joint faces (16b) and the ventral joint faces (16s) of the body-half segments (10L) (10R) are adhered in a bordered state. Thereby, the lure body (10) which is assembled to be a substantially oval cross section can be prevented from being naturally made flat by a state of stretching from the inside hollow.

In this case, the dorsal fin parts (12) continuing to the dorsal joint faces (16b) and the ventral fin parts (13) continuing to the ventral joint faces (16s) are adhered entirely, and almost front halves of the anal fin parts (14) are also adhered, thereby having a sufficiently great allowance for adhesion.

Where the body-half segments (10L), (10R) which are in a state that both faces are attached face to face are sandwiched (pressed) via the shape retaining core film (17) shown in FIG. 9 and FIG. 10, a plasticizer contained in the vinyl chloride resin which is a material of the shape retaining core film (17) transfer to the body-half segments (10L) (10R) made of the above described acrylic resin or polystyrene, and these segments are fused strongly and integrally for a short period of time due to what is called exchange action of plasticizers used therein. Thus, there is eliminated a necessity for using a special adhesive agent or organic solvent, and the segments can be easily assembled into the lure body (10) which forms a substantially oval cross section. Fused parts (adhered parts) thereof are shown by dots in FIG. 7 and FIG. 8 as well as FIG. 22 and FIG. 23.

The bait fish for catching tuna in the present embodiment is a fish shaped lure (A) which resembles sardine. For example, dimensional information on a medium-size lure includes that an entire length (L) from the mouth part (11) of the lure body (10) to the caudal fin part (15) is about 225 mm, a long-axis length (Y) of a part having the largest in thickness at which the lure body (10) is assembled to be a substantially oval cross section is about 46 mm, and a short-axis length (X) thereof is about 20.5 mm.

Further, the flat dorsal joint faces (16b) and the flat ventral joint faces (16s) extending in such a state that they form borders along the edges of the lure body (10) are substantially equal, that is, about 5 mm to 6 mm in width (allowance for adhesion) (W1). A part of the dorsal joint faces (16b) which borders the mouth part (11) and a part of the ventral joint faces (16s) which borders the mouth part (11) are greatest in width, that is, about 10 mm to 13 mm (allowance for adhesion) (W2).

In this case, a symbol (H) in FIG. 9 indicates the height of the shape retaining core film (17) at a part corresponding to the long axis of the thickest part of the lure body (10) which forms a substantially oval cross section. The shape retaining core film (17) inserted and set inside the lure body (10) is increased or decreased in height (H), by which the lure body (10) can be adjusted so that a waistline thereof is made thin or thick.

Figure 11:
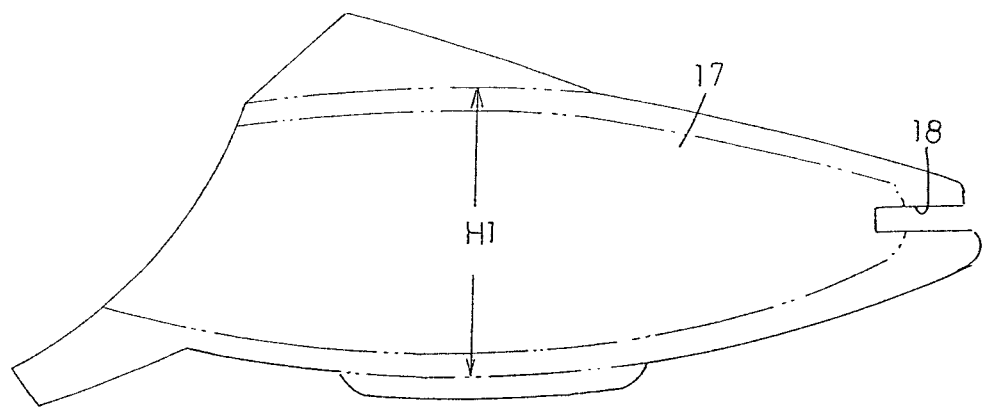
FIG. 11 is a side view corresponding to FIG. 9 which shows a shape retaining core film large in height.
Figure 12:
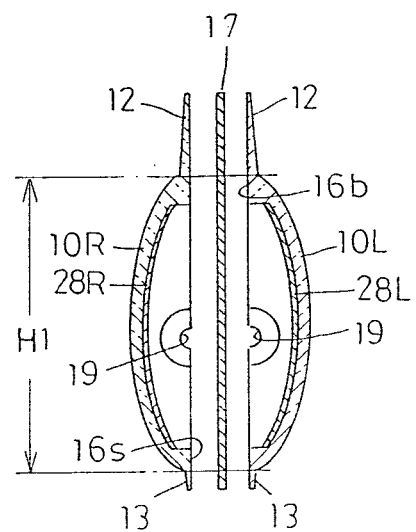
FIG. 12 is an exploded sectional view which shows a relative positional relationship between the shape retaining core film and both body-half segments in FIG. 11.
Figure 13:
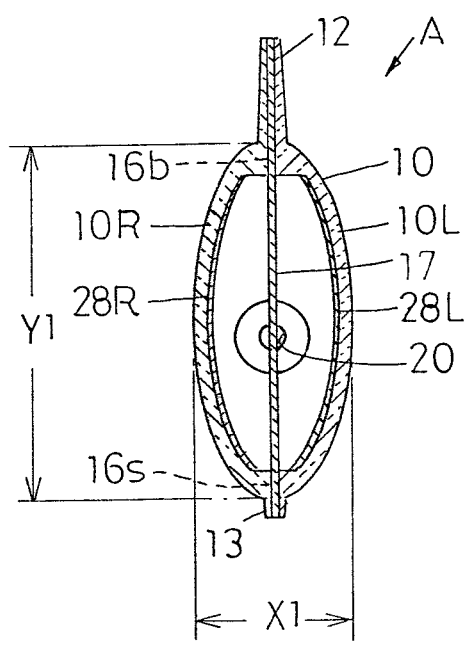
FIG. 13 is a sectional view which shows a state that the components given in FIG. 12 are adhered.

The body-half segments (10L) (10R) molded to be a substantially semi-oval cross section are kept uniform in dimension, based on which the height (H) of the shape retaining core film (17) is increased in dimension relatively as shown by a reference numeral (H1) in FIG. 11 and FIG. 12. Thereby, the lure body (10) assembled to be a substantially oval cross section is made longer in long-axis length (Y) as shown by a reference numeral (Y1) in FIG. 13, while the lure body (10) is made shorter in short-axis length (X) as shown by a reference numeral (X1) in the same drawing. Thus, there is obtained what is called the lure body (10) which is thin in waistline.

Figure 14:
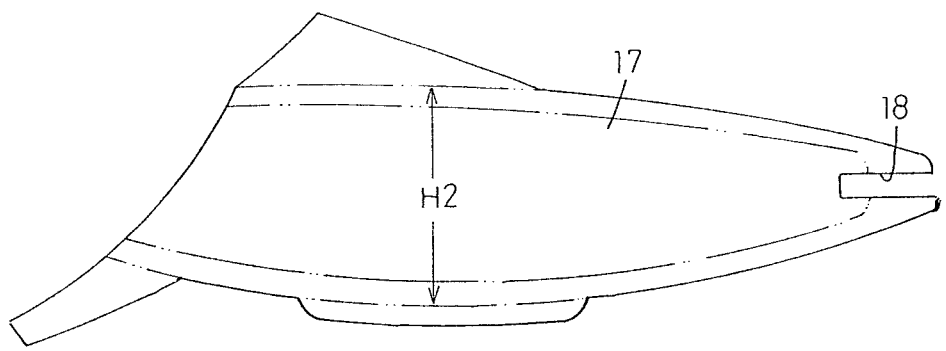
FIG. 14 is a side view corresponding to FIG. 9 which shows a shape retaining core film small in height.
Figure 15:
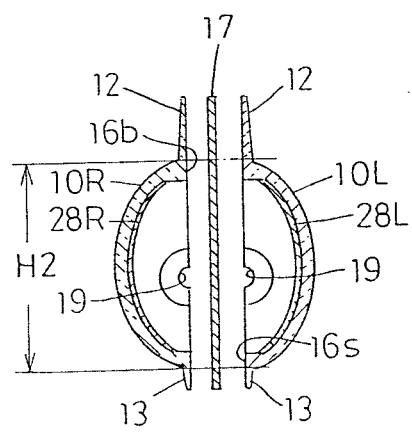
FIG. 15 is an exploded sectional view which shows a relative positional relationship between the shape retaining core film and both the body-half segments in FIG. 14.
Figure 16:
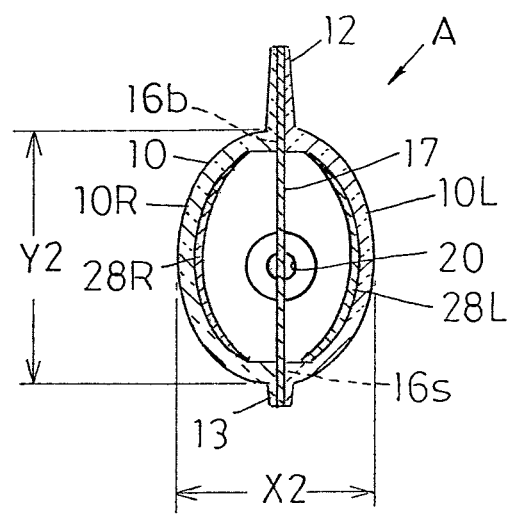
FIG. 16 is a sectional view which shows a state that the components in FIG. 15 are adhered.

In contrast, the shape retaining core film (17) is decreased in height (H) as shown by a reference numeral (H2) in FIG. 14 and FIG. 15, by which the lure body (10) assembled to be a substantially oval cross section is made shorter in long-axis length (Y) as shown by a reference numeral (Y2) in FIG. 16, while the lure body (10) is made longer in short-axis length (X) as shown by a reference numeral (X2) in the same drawing. Thus, there is obtained what is called the lure body (10) which is thick in waistline.

Figure 1:
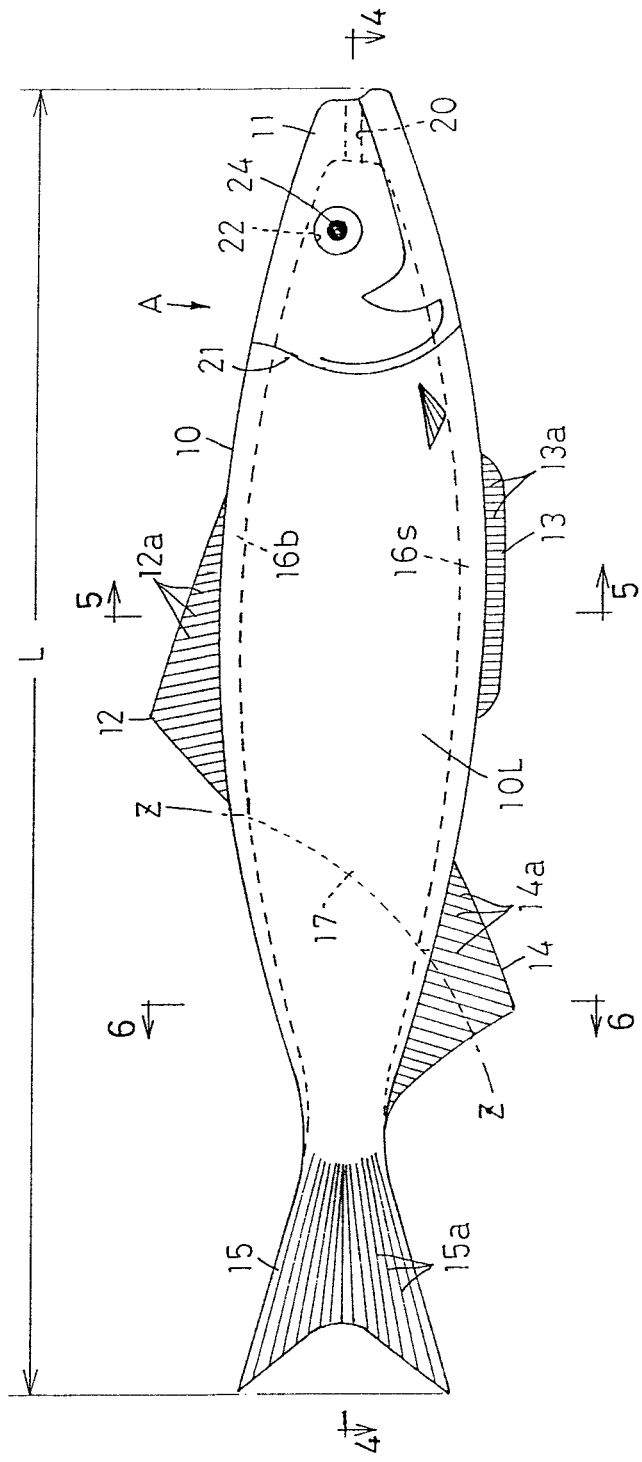
FIG. 1 is a side view of a fish shaped lure according to a first embodiment of the present invention.
Figure 2:
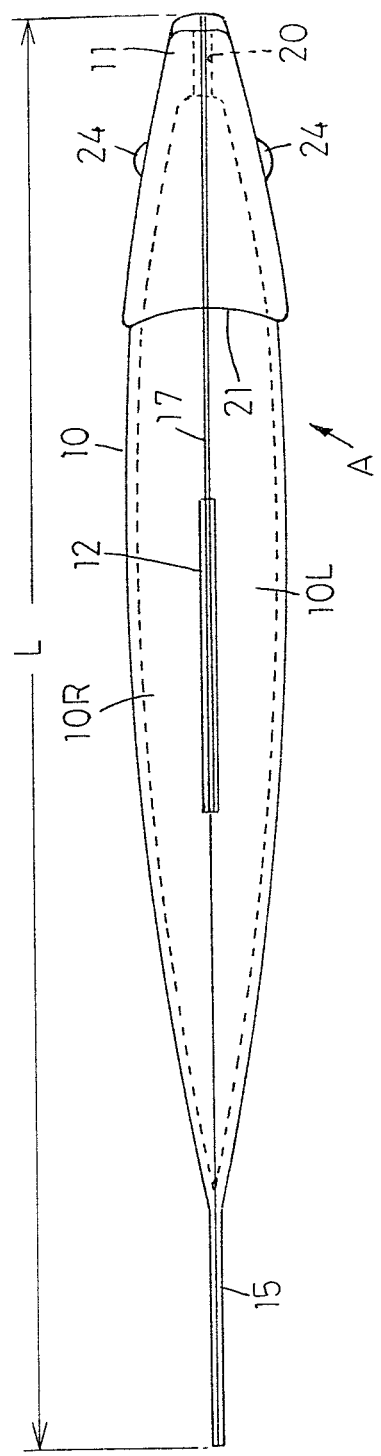
FIG. 2 is a plan view of FIG. 1.
Figure 3:
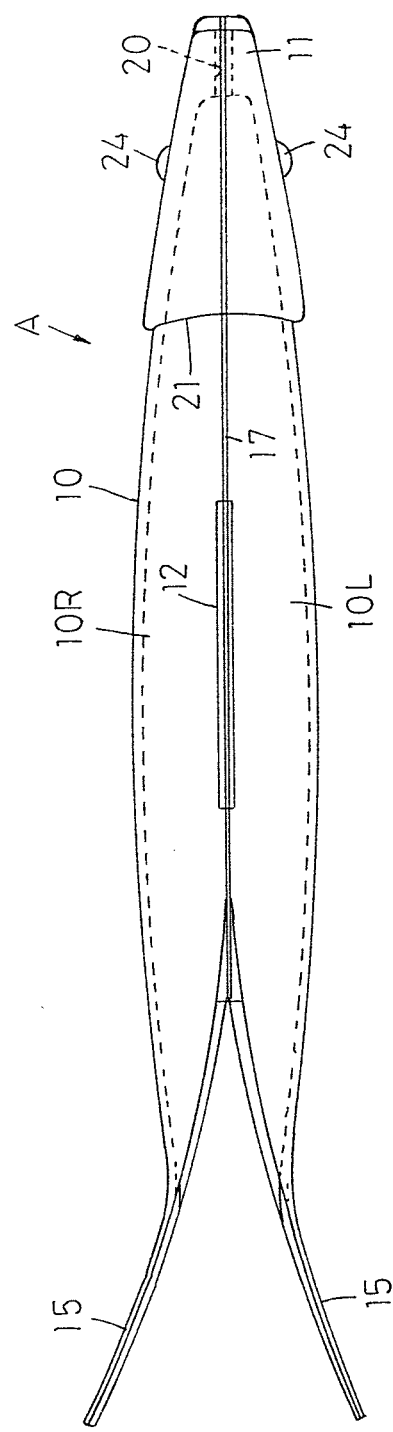
FIG. 3 is a plan view corresponding to FIG. 2 which shows an opening state of the rear end sides adhered to a lure body.

On the other hand, the shape retaining core film (17) is not provided between the rear end sides from the virtual line (Z-Z) which connects the vicinity of the rear end at the dorsal fin part (12) with the vicinity of the intermediate site at the anal fin part (14) in the body-half segments (10L) (10R), and the body-half segments (10L) (10R) are not adhered directly but kept open. Thereby, as shown in FIG. 3, the caudal fin part (15) of the lure body (10) is able to open and close in such a manner that the caudal fin part (15) can sway freely in the lateral direction.

Parts of the front head sides from the virtual line (Z-Z) in which the body-half segments (10L), (10R) of the lure body (10) are adhered in a bordered state are thickly molded, for example, about 3 mm to 5 mm in average thickness. In contrast, parts which remain so as to be kept open on the rear end sides from the virtual line (Z-Z) are, for example, about 0.5 mm to 2.0 mm in average thickness. As moving closer to the caudal fin part (15), these parts gradually become thinner and flat. Thereby, the fish shaped lure is provided with flexibility which is closely similar to a bait fish (biting feeling of tuna, fish to be caught) and able to exhibit in an accelerated manner smooth elastic deformation of the bait fish and movement that the caudal fin part (15) sways freely.

Figure 4:
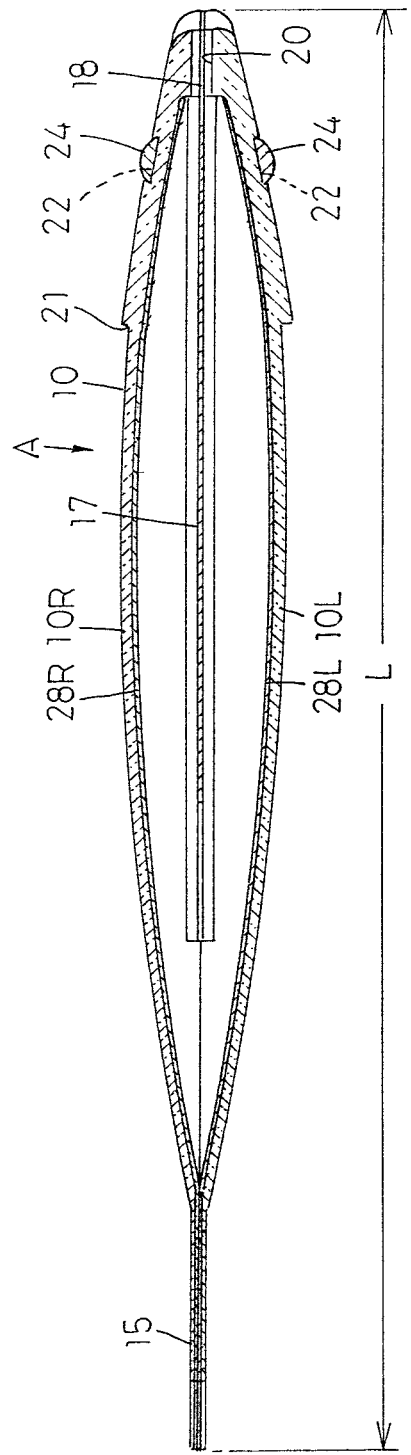
FIG. 4 is a sectional view taken along the line 4 to 4 in FIG. 1.
Figure 5:
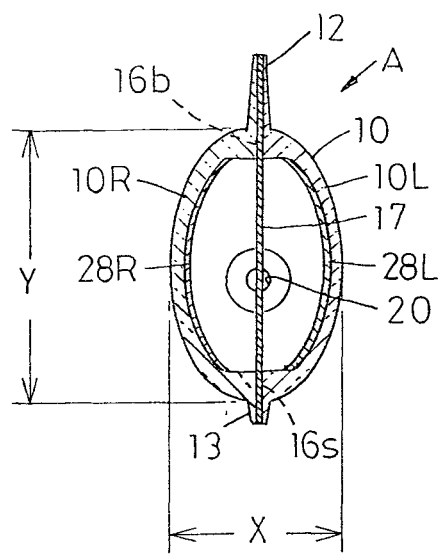
FIG. 5 is a sectional view taken along the line 5 to 5 in FIG. 1.
Figure 6:
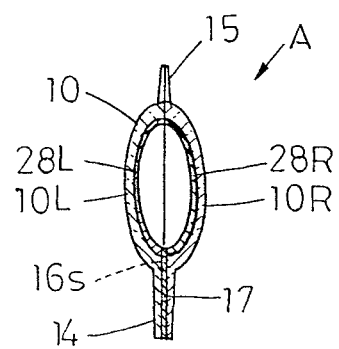
FIG. 6 is a sectional view taken along the line 6 to 6 in FIG. 1.

A reference numeral (19) indicates a line insertion recessed groove which is recessed from each of the flat dorsal joint faces (16b) and each of the flat ventral joint faces (16s) which border the mouth part (11) of the body-half segments (10L), (10R) in the fish shape. The dorsal joint faces (16b) and the ventral joint faces (16s) are adhered via the shape retaining core film (17) and kept assembled, thereby forming a line insertion hole (20) communicatively connected to the interior of the lure body (10) which is hollow and also to the line release notch (18) of the shape retaining core film (17), as shown in FIG. 4 and FIG. 5.

A reference numeral (21) indicates a gill cover part which is shaped so as to be raised on a convex curved surface on the surface side (outside) of each of the body-half segments (10L), (10R) which forms a substantially semi-oval cross section. Reference numerals (12a), (13a), (14a), (15a) indicate irregular grooves which are shaped on the respective surfaces of the dorsal fin part (12), the ventral fin part (13), the anal fin part (14) and the caudal fin part (15). Light emitted on these grooves is reflected to shine the lure body (10) glisten and shimmer as if it is a bait fish.

Further, a reference numeral (22) indicates a circular eye-accepting recessed step face which is shaped on a raised curved surface of the surface side (outside) on each of the body-half segments (10L), (10R), into which a transfer seal (S1) which depicts the eye of a bait fish is to be pasted so as to be fitted.

Figure 17:
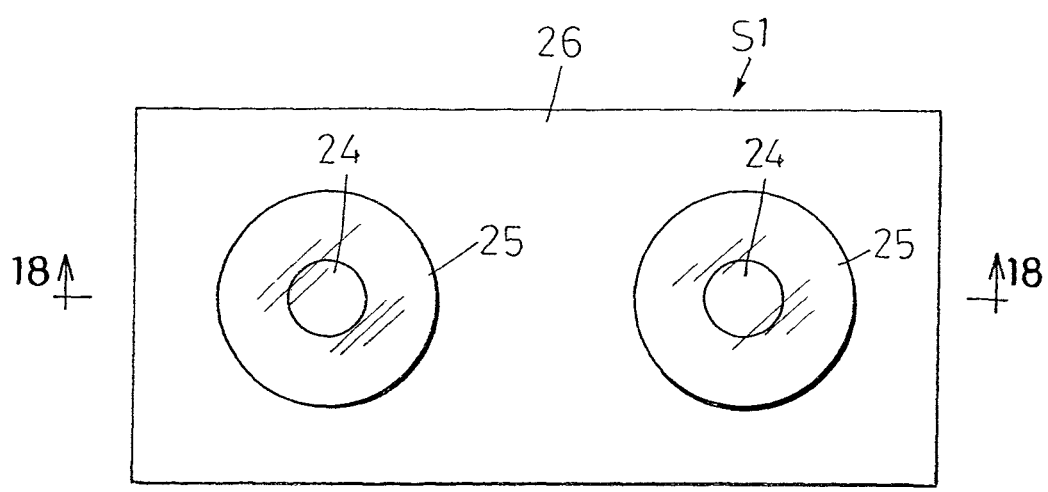
FIG. 17 is a plan view which shows that a transfer seal of eyes is extracted.
Figure 18:
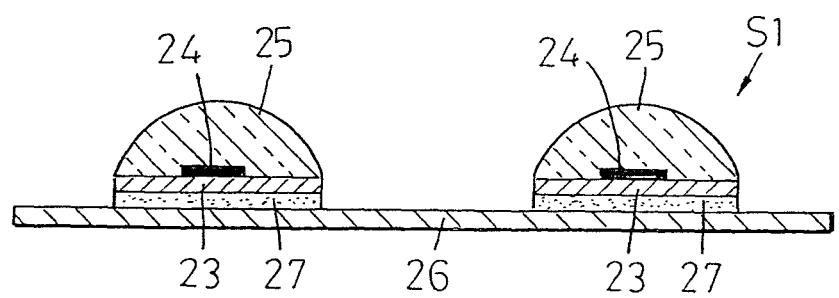
FIG. 18 is a sectional view taken along the line 18 to 18 in FIG. 17.

It is preferable that the transfer seal (S1) is such that, as shown in FIG. 17 and FIG. 18, for example, color coating or color printing is given to the surface of a soft reflection sheet (23) to which hologram processing or metal vapor deposition are performed to provide eyes (24) of a bait fish, a conical cover (25) made of a transparent thermoplastic resin is used to conduct masking, there is also provided what is called tacking paper in which a mold releasing sheet (26) is in advance pasted on the back side of the soft reflection sheet (23), and an adhesive agent layer (27) exposed by pealing off the mold releasing sheet (26) is used to paste the eyes on the eye-accepting recessed step faces (22) of the lure body (10).

Further, reference numerals (28L), (28R) indicate a pair of symmetrical transfer sheets substantially similar in dimension and having a configuration (the fish shape of a bait fish) to the body-half segments (10L), (10R) of the lure body (10). Each of the transfer sheets is obtained by color-printing a realistic image (picture) (29) identical or similar to an external appearance (pattern as a design and/or color) of the bait fish on the surface (one side) of a printing hologram sheet (28).

Figure 19:
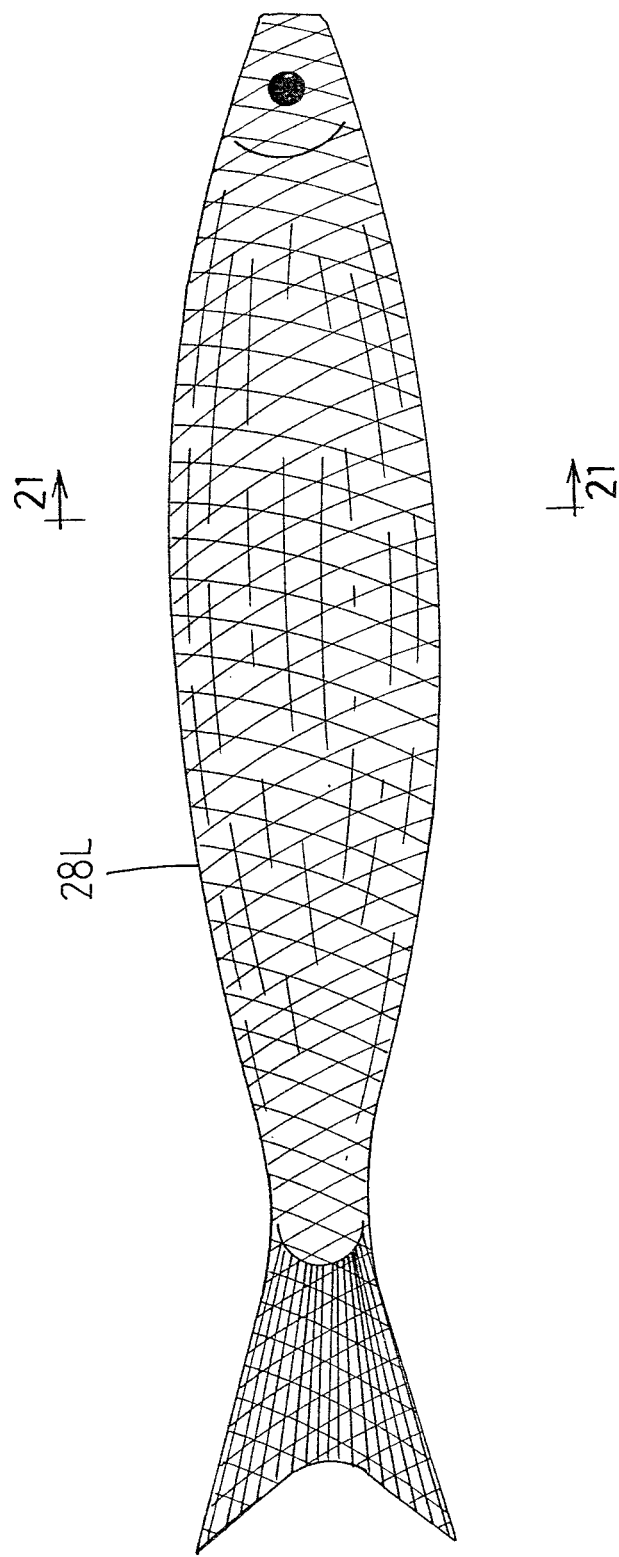
FIG. 19 is a side view which shows that a left-side transfer sheet of a fish shape is extracted.
Figure 20:
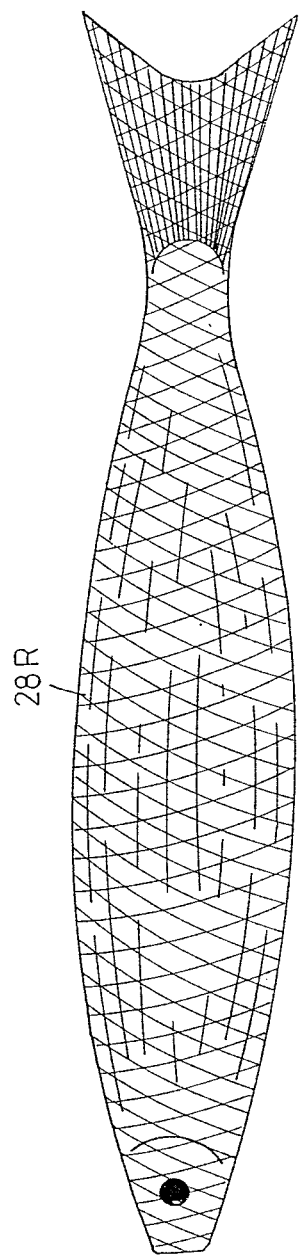
FIG. 20 is a side view which shows that a right-side transfer sheet of the fish shape is extracted.
Figure 21:
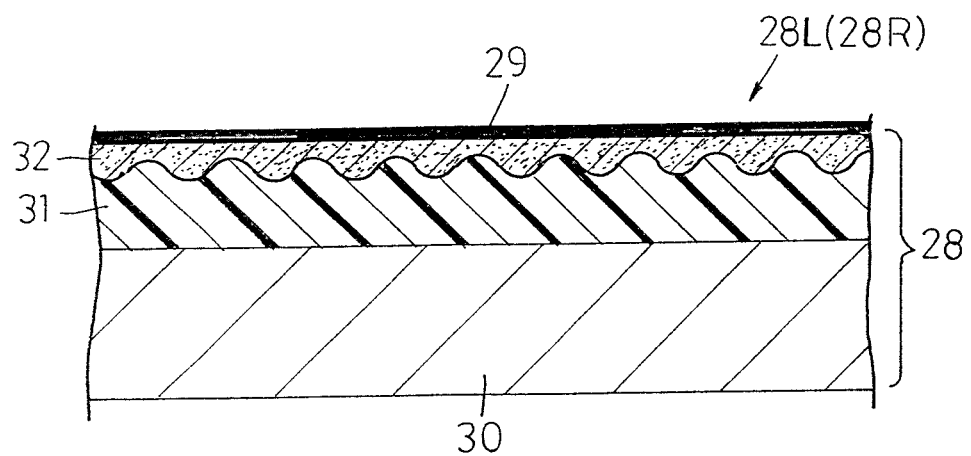
FIG. 21 is an enlarged sectional view taken along the line 21 to 21 in FIG. 19.
Figure 22:
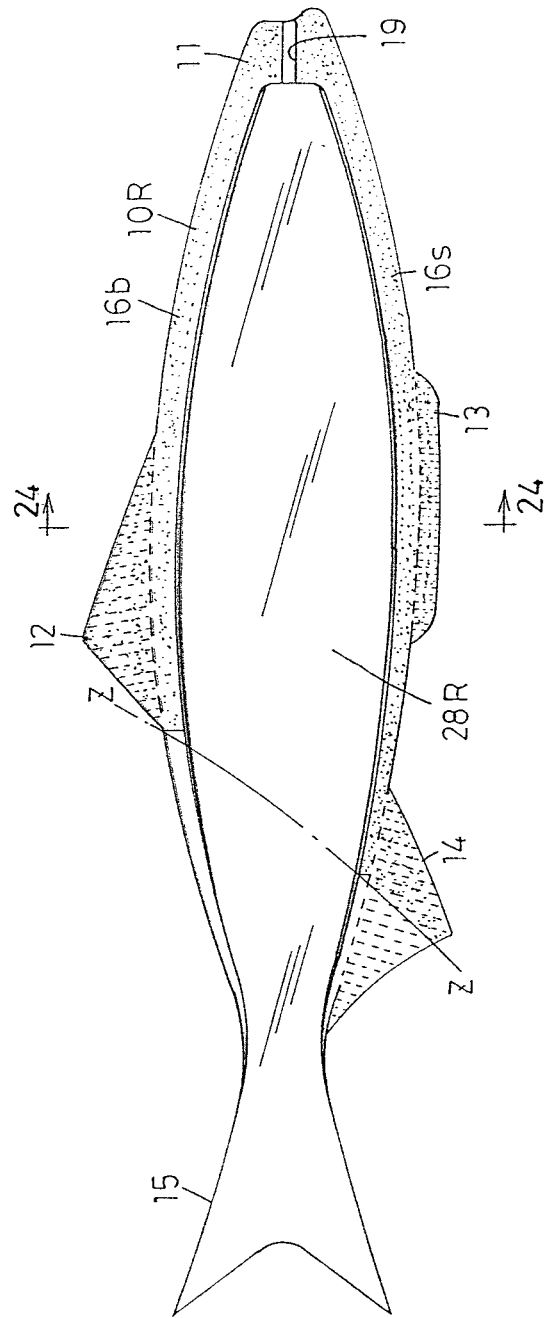
FIG. 22 is a side view which shows a state that the transfer sheet is adhered to the back side (inner face) of the right-side body-half segment.
Figure 23:
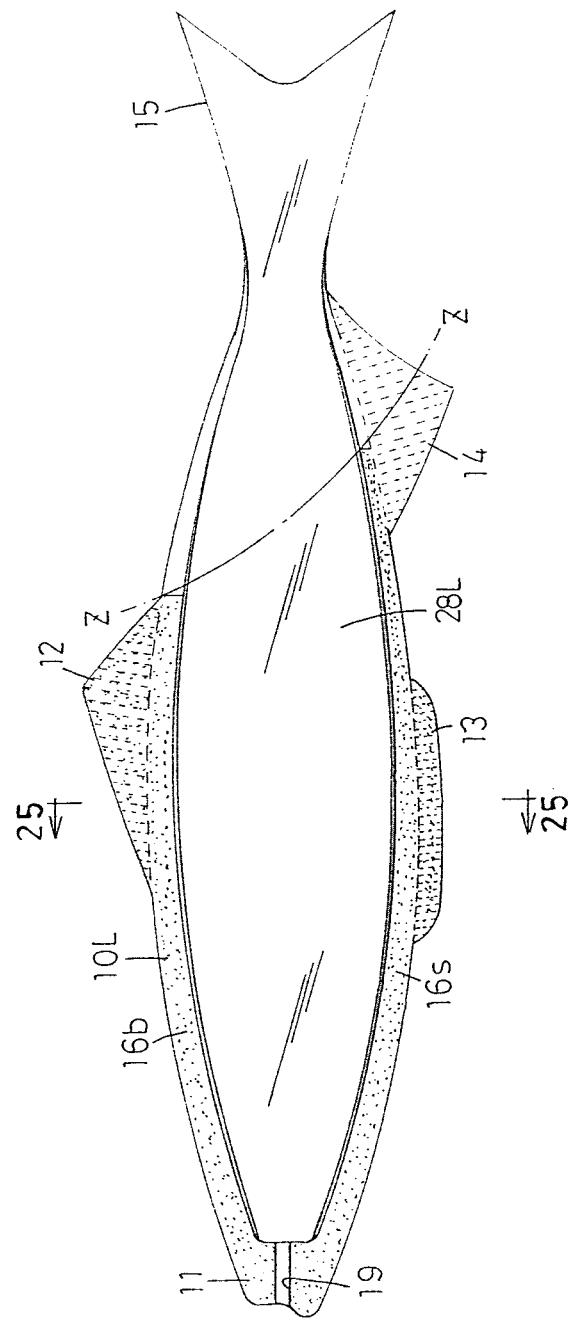
FIG. 23 is a side view which shows a state that the transfer sheet is adhered to the back side (inner face) of the left-side body-half segment.
Figure 24:
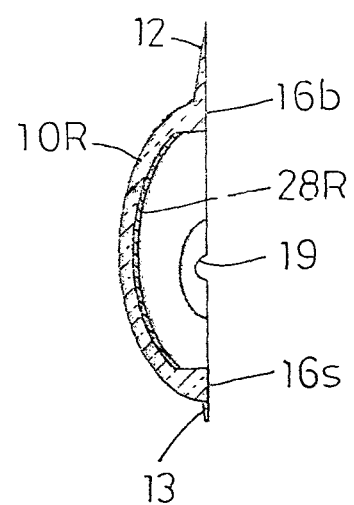
FIG. 24 is a sectional view taken along the line 24 to 24 in FIG. 22.
Figure 25:
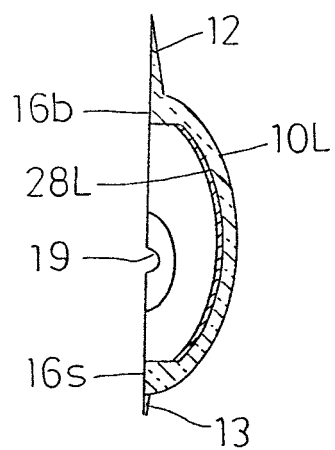
FIG. 25 is a sectional view taken along the line 25 to 25 in FIG. 23.

As shown by being extracted in FIG. 19 to FIG. 21, the hologram sheet (28) of each of the transfer sheets (28L), (28R) is a laminated body which is made up of a paper substrate sheet (adhered board) (30) having printing transfer characteristics, a hologram forming resin sheet (31) and a metal reflection layer (32) prepared by fusing metal powder or vapor-depositing metal foil such as aluminum or silver on the hologram forming face. The realistic image (29) which gives an impression of the bait fish is color-printed on the surface of the metal reflection layer (32) which reflects metallic luster according to offset printing preferably by using an ultraviolet curing ink or an oil-based ink.

The above described image (29) is color-printed on the surface of the hologram sheet (28) before adhesion of the transfer sheets (28L), (28R) on the body-half segments (10L), (10R) of the lure body (10). Thus, there is no restriction on working thereof, and there are also obtained various species of bait fish which are highly accurate in external appearance (design) as desired.

Next, except for the dorsal joint faces (16b) and the ventral joint faces (16s) of the body-half segments (10L), (10R) extending in such a state that they form borders along the edges of the lure body, each of the transfer sheets (28L), (28R) adheres to a convex curved face in its entirety on the back side (inner side) which forms a substantially semi-oval cross section and a flat face of the caudal fin part (15) from the back side (inner side) by using ketone (preferably acetone) or other colorless organic solvents or colorless adhesive agents in a transferred state in which the image (29) is viewed perspectively from the surface side (outside) of the lure body (10), as shown in FIG. 22 to FIG. 25.

Adhesion work is performed in such a manner that a rotating roller (not shown) is used to press the transfer sheets (28L), (28R) on the back sides (inner faces) of the body-half segments (10L), (10R) molded to be a substantially semi-oval cross section. Therefore, the body-half segments (10L), (10R) which have received the pressing force are expanded from a molded state in which a substantially semi-oval cross section is cured to deform a flat state.

In this case, the hologram forming resin sheet (31) which constitutes the hologram sheet (28) of each of the transfer sheets (28L), (28R) is such that a relief-type hologram is imparted on the surface of a flexible thermoplastic resin such as a polyethylene resin or a polyethylene terephthalate resin. Therefore, the hologram forming resin sheet (31) is able to deform and follow the body-half segments (10L), (10R) and restore its original state together with the body-half segments (10L), (10R) upon release of the pressing force. However, the paper substrate sheet (adhered board) (30) for printing with which the hologram forming resin sheet (31) is lined is free from contractility and flexibility which allow to follow and deform the body-half segments (10L), (10R). Thereby, the body-half segments (10L), (10R) in a flat state to which the transfer sheets (28L), (28R) are adhered are to disturb such deformation that they will restore to the original state to be a substantially semi-oval cross section, thus resulting in a failure of obtaining the lure body (10) closely similar to a bait fish in thickness.

Thus, if the transfer sheets (28L), (28R) are adhered to the body-half segments (10L), (10R) of the lure body (10), the body-half segments (10L), (10R) are submerged into hot water to scrape and remove the paper substrate sheet (30) the fibers of which becomes loose and soften by using a brush (not shown) or the like. A method for removing the paper substrate sheet (30) includes not only scraping by using a brush but also dissolution by solution using a drug and other appropriate methods.

In either case, each of the transfer sheets (28L), (28R) in which the image (29) of a bait fish is imparted to the hologram sheet (28) is covered from the surface side (outside) with the transparent lure body (10). Therefore, there is no fear that the lure body is stained from the surface side (outside) by the image (29). Also, the image (29) viewed perspectively and observed in a mixed state with the hologram image is able to make a strong impression of actions that scales of the bait fish glisten and shimmer together with light reflection of the metal reflection layer (32).

Upon adhesion of the transfer sheets (28L), (28R), it is acceptable that the surface (one side) of the hologram sheet (28) to which the image (29) has been imparted is directly adhered to the back side (inner face) of each of the body-half segments (10L), (10R) by coating a colorless organic solvent or an adhesive agent. However, it is preferable that, as shown in a partially modified embodiment in FIG. 26 and FIG. 27, a mold releasing sheet (34) which is a transparent thermoplastic resin film is made available in what is called a tacking paper or a transfer seal (S2) on which the image (29) has been in advance pasted in a masking state via a colorless organic solvent layer or an adhesive agent layer (33) coated on the surface (one side) of the hologram sheet (28), and as shown in FIG. 22 to FIG. 25, the organic solvent layer or the adhesive agent layer (33) which has been exposed by pealing off the mold releasing sheet (34) on usage is used to adhere the hologram sheet (28) of each of the transfer sheets (28L), (28R) from the back side (inner side) of each of the body-half segments (10L), (10R) so that the image (29) can be viewed perspectively from the surface side (outside) of the lure body (10).

Figure 26:
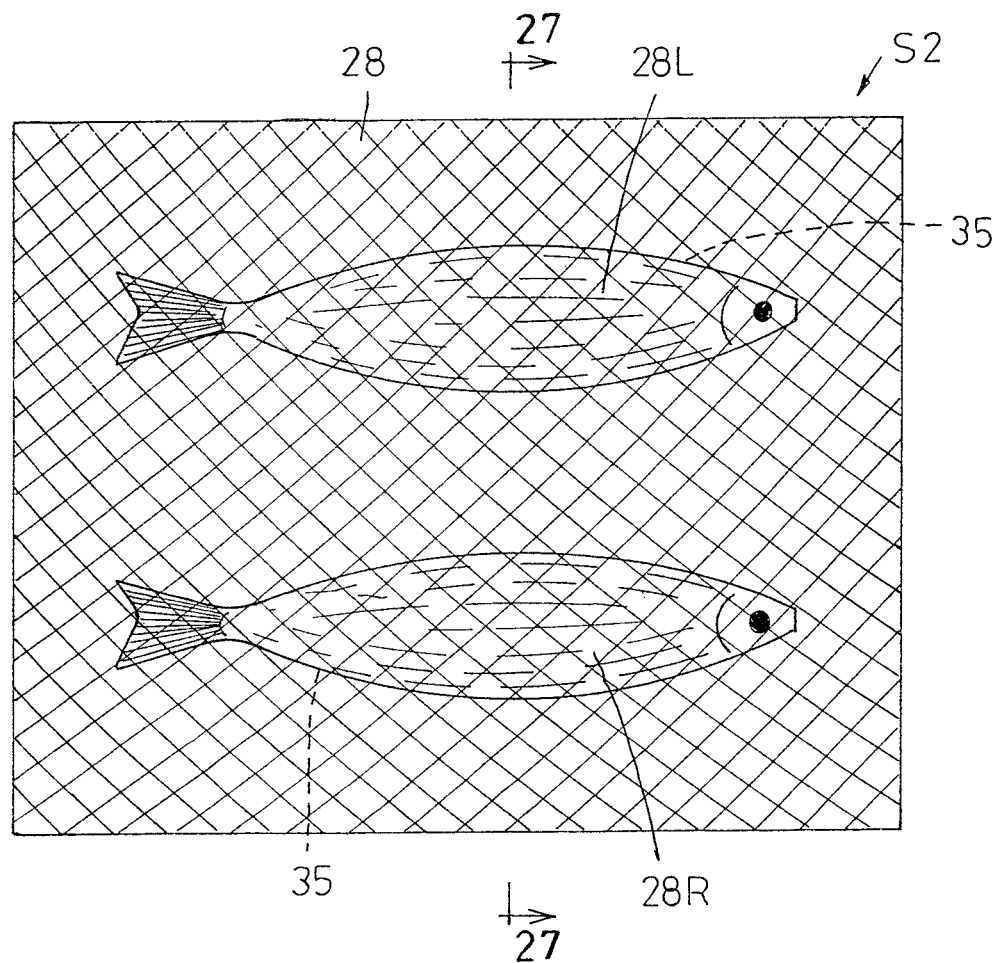
FIG. 26 shows a modified embodiment of the transfer sheet and shows that it is used as a transfer seal or tacking paper.
Figure 27:
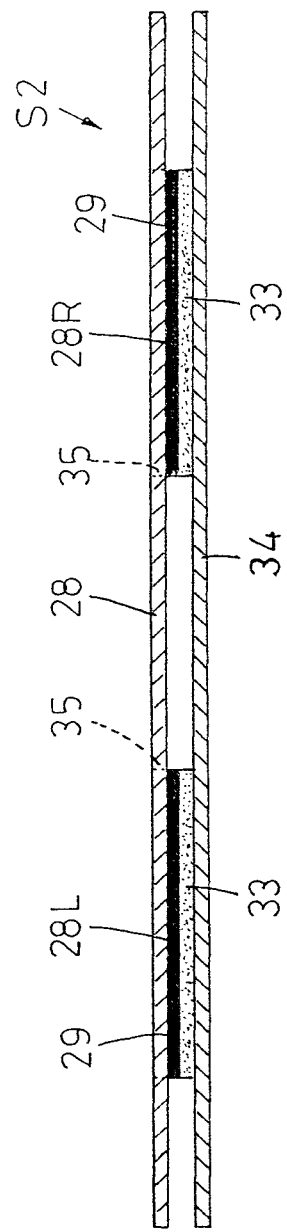
FIG. 27 is an enlarged sectional view taken along the line 27 to 27 in FIG. 26

In this case, in the partially modified embodiment in FIG. 26 and FIG. 27, the hologram sheet (28) of each of the transfer sheets (28L), (28R) made available as the tacking paper or the transfer seal (S2) is given as a dimensionally large and definitely shaped adhered board commonly used by the pair of symmetrical transfer sheets (28L), (28R), the transparent mold releasing sheet (34) on which the image (29) has been pasted in a masking state is also made so as to be identical in dimension and configuration with the hologram sheet (28), and a border cutting line or a mold cutting line (35) of the fish shape corresponding to each of the body-half segments (10L), (10R) is imparted to the mold releasing sheet (34) and/or the hologram sheet (28), by which the pair of symmetrical transfer sheets (28L), (28R) are cut out from the cutting line or the mold cutting line (35) to attain such a state that they can be transferred to the body-half segments (10L), (10R).

Next, the transfer sheets (28L), (28R) are adhered to the convex curved face in its entirety on the back side (inner side) of each of the body-half segments (10L), (10R) which forms the lure body (10) and the flat face of the caudal fin part (15), as shown in FIG. 22 to FIG. 25. After removal of the paper substrate sheet (30) of each of the transfer sheets (28L), (28R), the dorsal joint faces (16b) and the ventral joint faces (16s) of the body-half segments (10L), (10R) in a bordered state are adhered integrally in a fused state, with the shape retaining core film (17) provided between them. Thereby, the body-half segments (10L), (10R) are assembled into a fish shaped lure (A) having the hollow lure body (10) to be a substantially oval cross section, as shown in FIG. 1 to FIG. 6.

As apparent from FIG. 1 to FIG. 6 showing an assembly state thereof, the front head sides from the virtual line (Z-Z) which connects the vicinity of the rear end at the dorsal fin part (12) with the vicinity of the intermediate site at the anal fin part (14) in the lure body (10) occupy at least about ⅔ and preferably about ⅗ of the entire length (L) of the lure body (10) and are adhered in a bordered state by fusion of plasticizers contained in the shape retaining core film (17) provided between them and a hollow and substantially oval cross section. However, the rear end sides from the virtual line (Z-Z) or the remaining parts which occupy at most about ⅓ or less and preferably only about ⅖ are not adhered but in a naturally open state, with no shape retaining core film (17) placed between them.

Therefore, a line (37) in which a hook (36) has been in advance tied at the leading end (rear end) thereof is inserted from the rear end sides of the lure body (10) which are in an open state into the front head sides which are hollow and can be guided out and wired in front from the mouth part (ii) of the lure body (10), passing through the line release notch (18) of the shape retaining core film (17) and the line insertion hole (20) of the mouth part (11).

As a result, the shape retaining core film (17) provided inside the hollow lure body (10) is used in what is called a central partition wall and, thereby, even when the line (37) is inserted into one of left and right spaces thereof, the lure (A) moves back and forth along the line (37) in use, thereby attaining what is called a hook dropped state in which the hook (36) attached to the leading end (rear end) thereof is drawn from the lure (A).

Figure 28:
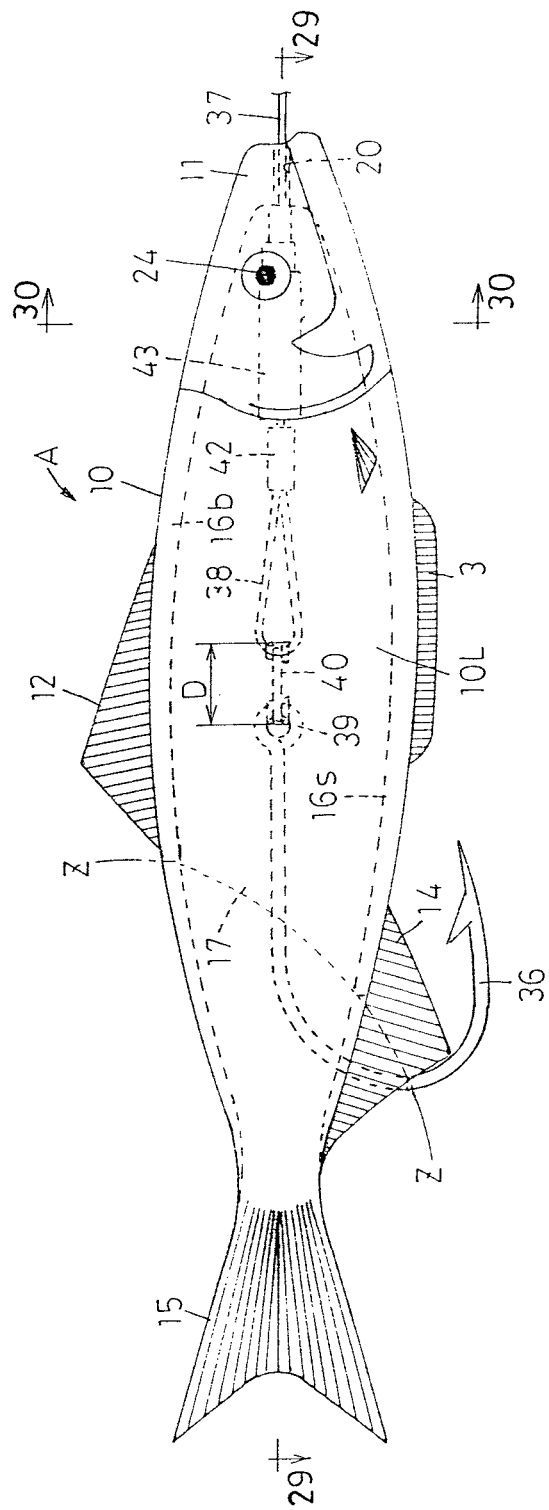
FIG. 28 is a side view which shows a positional relationship between a lure and a hook attached thereto.
Figure 29:
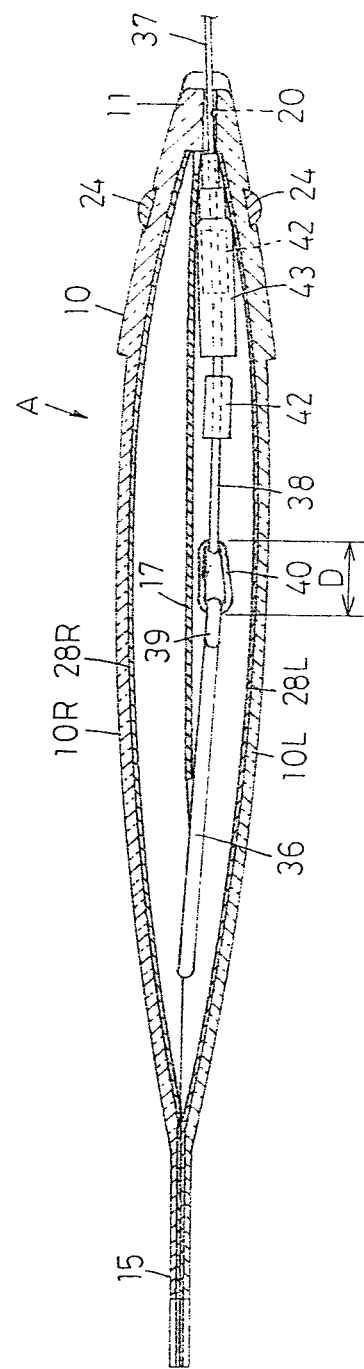
FIG. 29 is a sectional view taken along the line 29 to 29 in FIG. 28.
Figure 30:
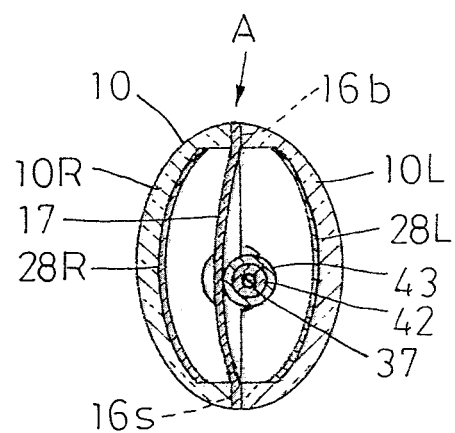
FIG. 30 is a sectional view taken along the line 30 to 30 in FIG. 28.
Figure 31:
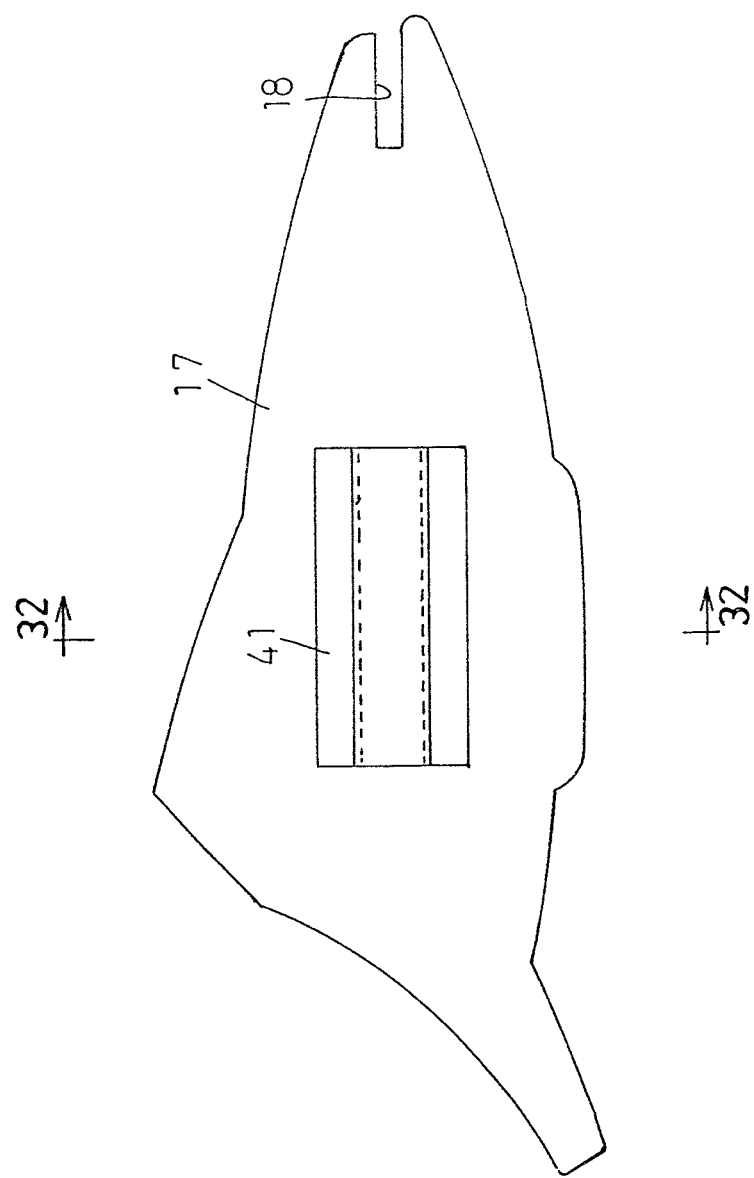
FIG. 31 is a side view which shows that the modified embodiment of the shape retaining core film is extracted.
Figure 32:
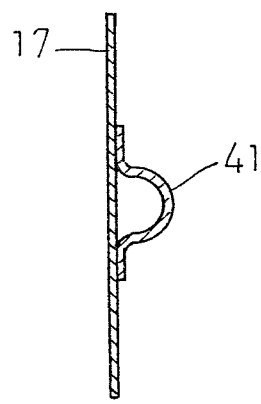
FIG. 32 is a sectional view taken along the line 32 to 32 in FIG. 31.

In this case, the leading end (rear end) of the line (37) is, as shown in FIG. 28 to FIG. 30, used as a connection ring (38) which is crimped and fixed in a folded state and coupled to an attachment ring (39) formed at the root (front end) of the hook (36) via a flexible band (40) made of a high-strength polyethylene fiber (preferably "Dyneema" (registered trade name). An action distance (D) of the coupling band (40) is adjusted for its length, by which the hook (36) is locked to the rear end (open edge) of the ventral joint face (16s) on the lure body (10) from the rear end side, and a length at which only a sharp leading-end side of the hook (36) is partially expanded and exposed outside (below) the lure body (10) can always be positioned and set uniform in length appropriately. The rear end (open edge) of the ventral joint face (16s) acts as a positioning stopper which receives the hook (36).

It is also acceptable that the line (37) is inserted into any one of the right and left spaces, with the shape retaining core film (17) given as a central partition wall. However, as shown in the partially modified embodiment in FIG. 31 and FIG. 32, it is also preferable that a cover piece (41) made of a transparent soft vinyl chloride resin or the like which encloses in particular a part of the line (37) coupled to the hook (36) is attached and fixed to the shape retaining core film (17) by fusion of plasticizers used therein, thermal fusion or by using a colorless adhesive agent.

Figure 33:
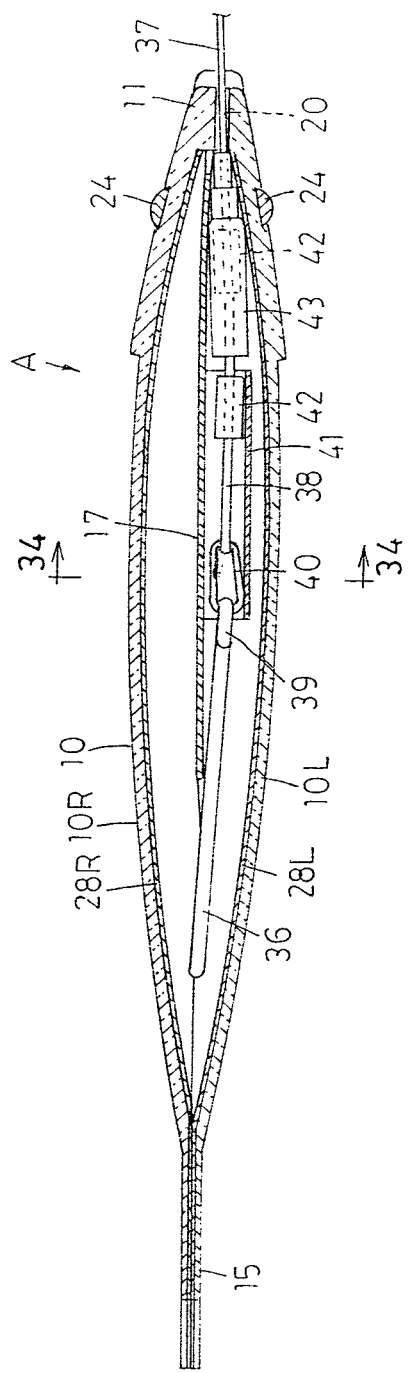
FIG. 33 is a sectional view corresponding to FIG. 29 which shows a state that a root of the hook is protected by the shape retaining core film in FIG. 31.
Figure 34:
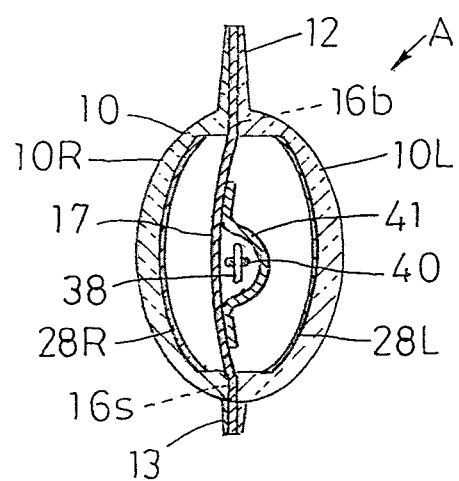
FIG. 34 is a sectional view taken along the line 34 to 34 in FIG. 33.
Figure 35:
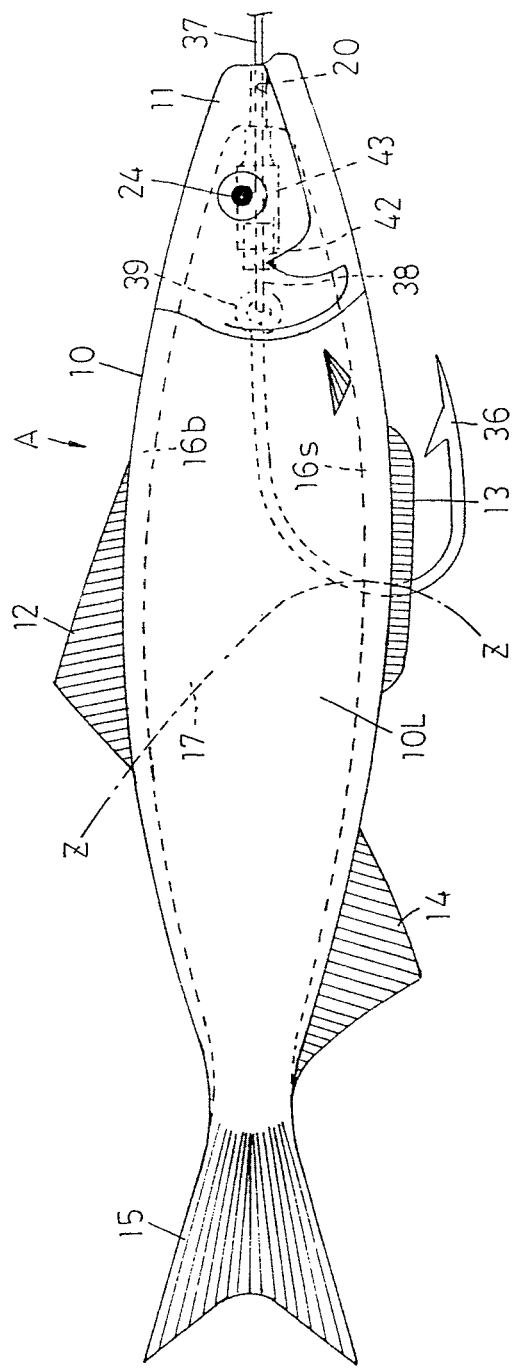
FIG. 35 is a side view corresponding to FIG. 28 which shows another positional relationship between the lure and the hook.
Figure 36:
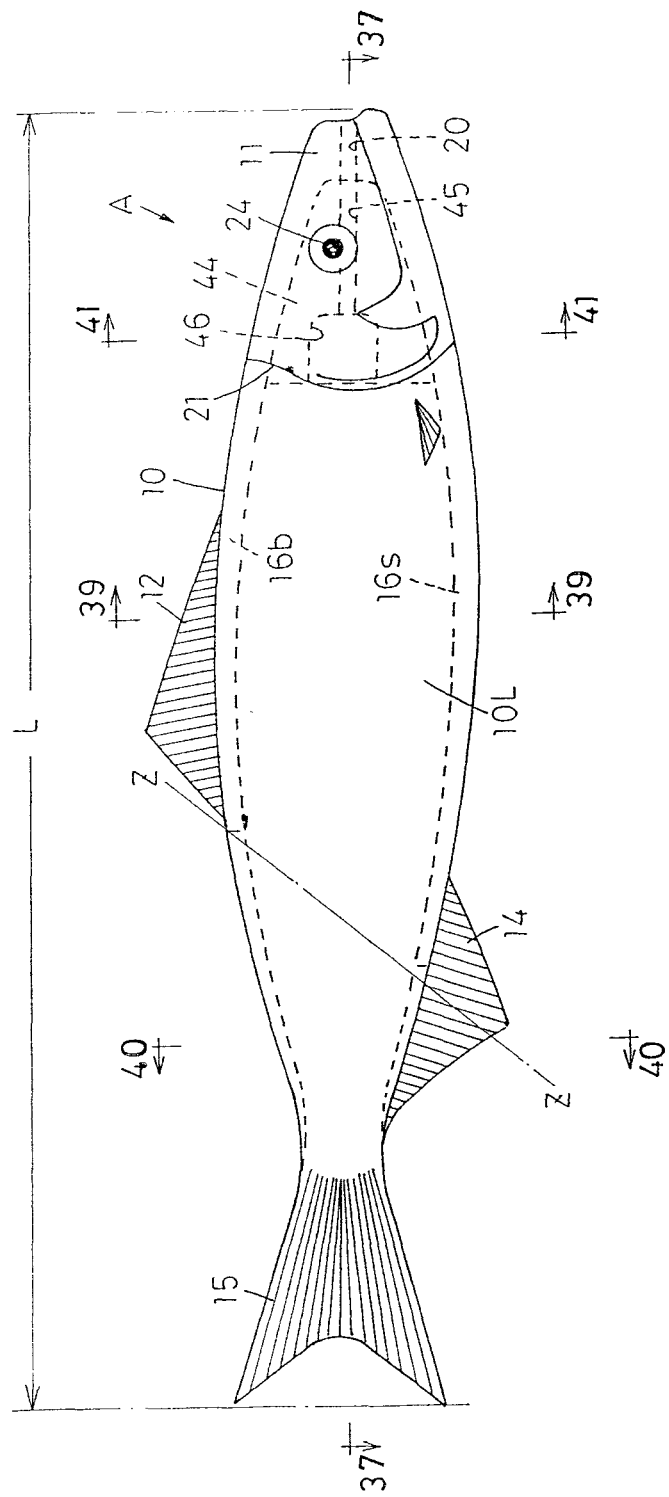
FIG. 36 is a side view corresponding to FIG. 1 which shows a fish shaped lure according to a second embodiment of the present invention.
Figure 37:
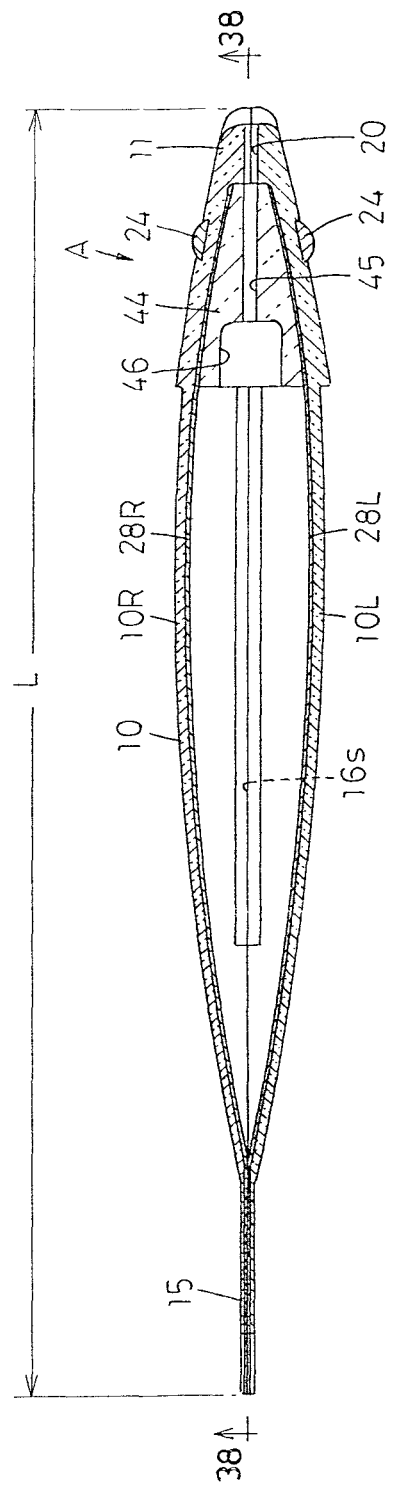
FIG. 37 is a sectional view taken along the line 37 to 37 in FIG. 36.
Figure 38:
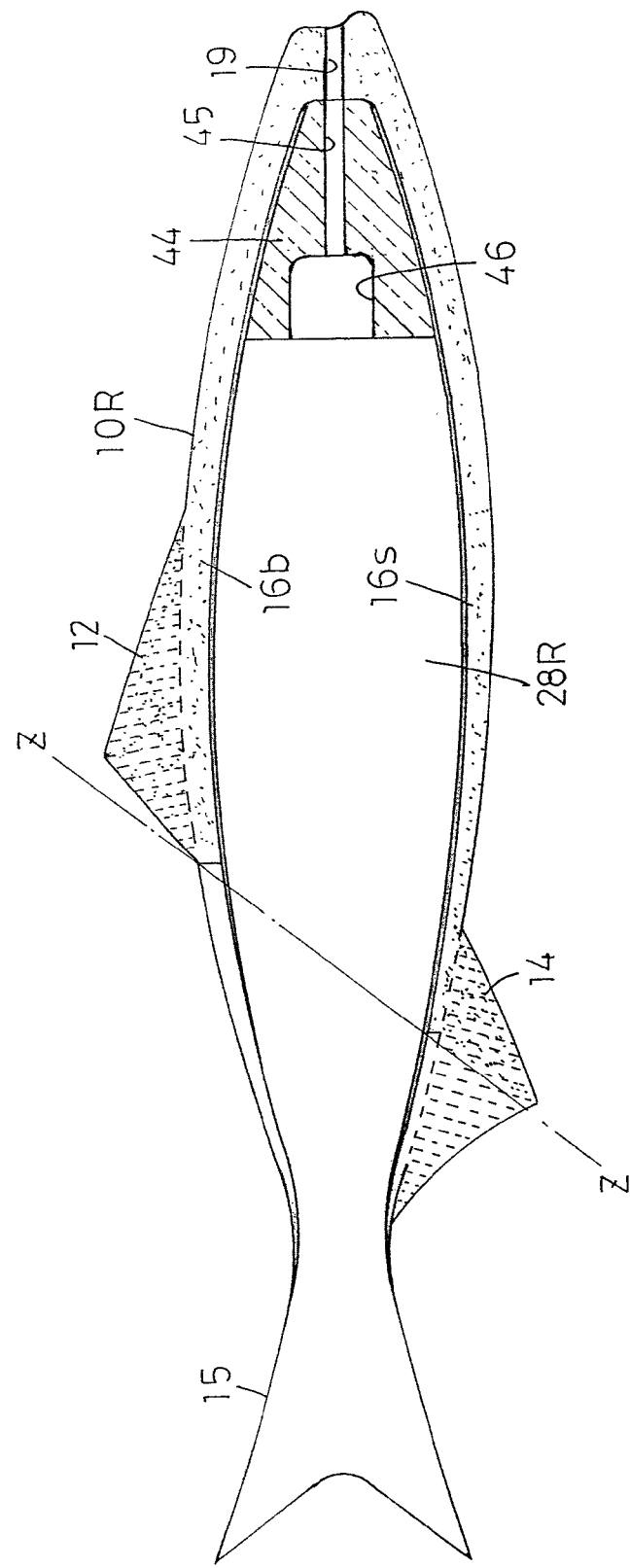
FIG. 38 is a sectional view taken along the line 38 to 38 in FIG. 37.
Figure 39:
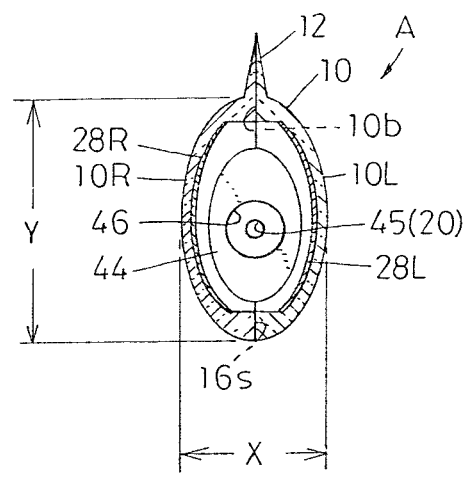
FIG. 39 is a sectional view taken along the line 39 to 39 in FIG. 36.
Figure 40:
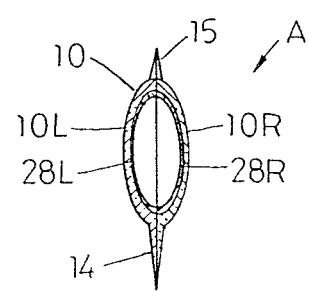
FIG. 40 is a sectional view taken along the line 40 to 40 in FIG. 36.
Figure 41:
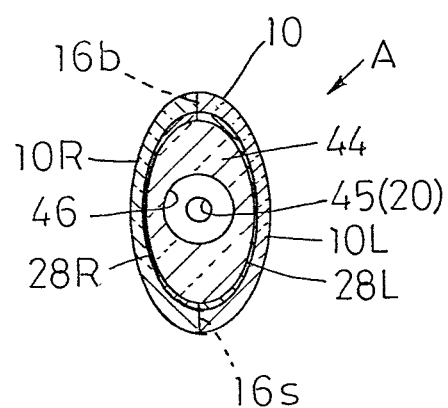
FIG. 41 is a sectional view taken along the line 41 to 41 in FIG. 36.
Figure 42:
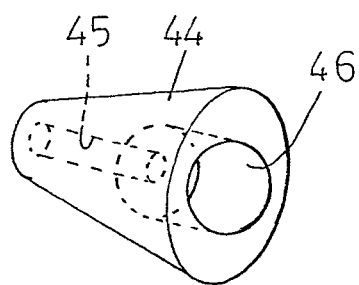
FIG. 42 is an inclined view which shows that a mouth part shape retaining core tube of the lure is extracted.
Figure 43:
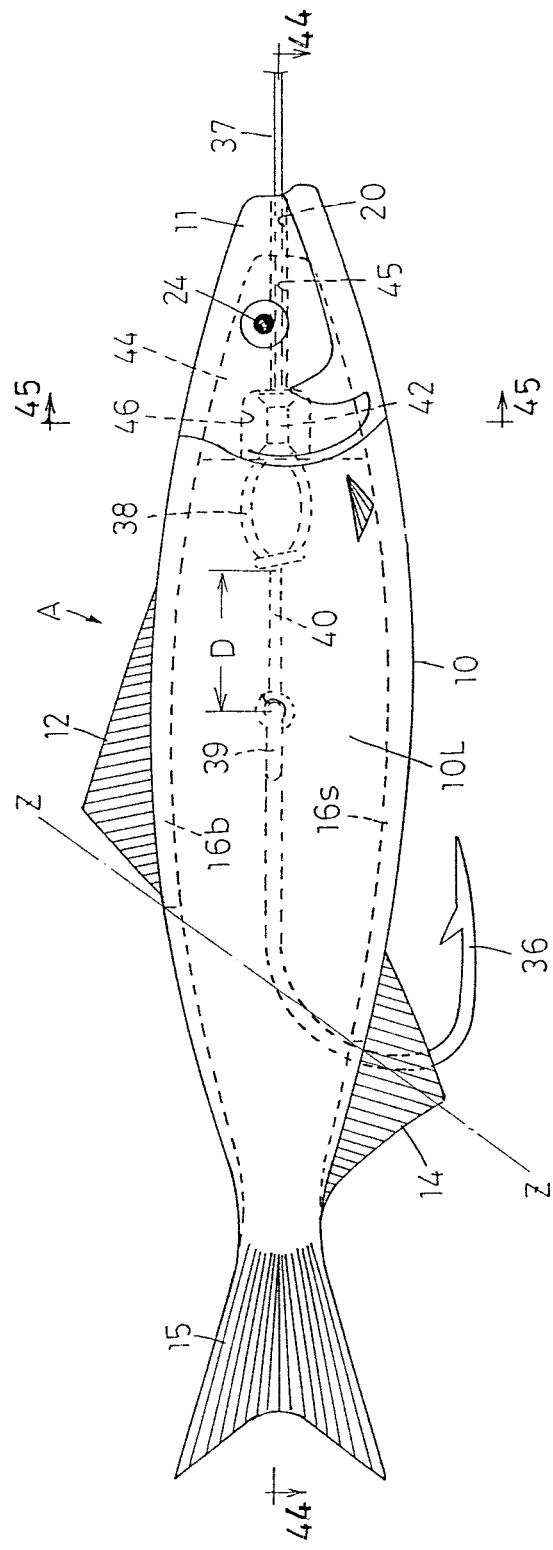
FIG. 43 is a side view corresponding to FIG. 28 which shows a positional relationship between a hook and a lure attached thereto in FIG. 36.
Figure 44:
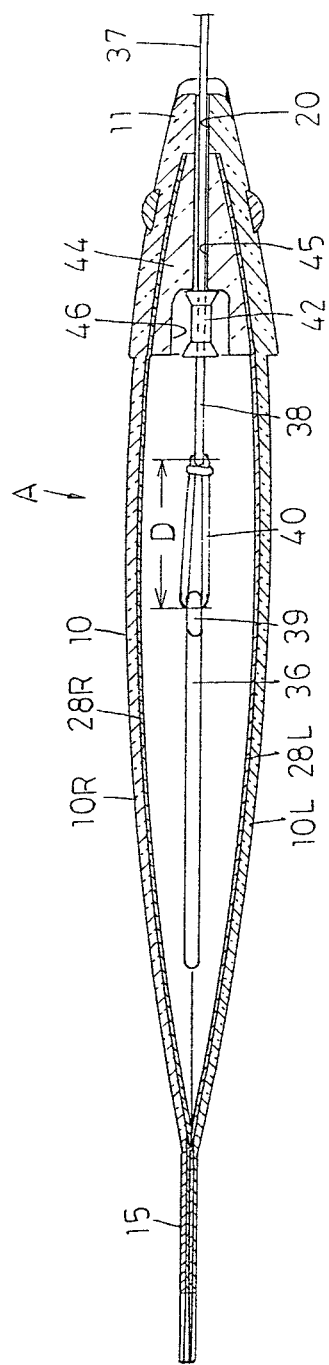
FIG. 44 is a sectional view taken along the line 44 to 44 in FIG. 43.
Figure 45:
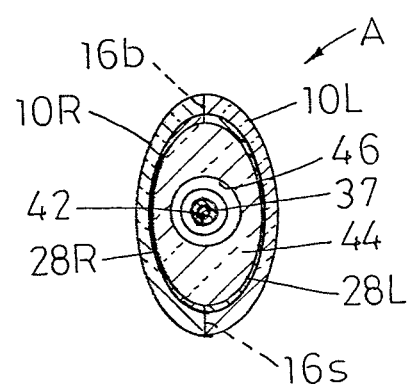
FIG. 45 is a sectional view taken along the line 45 to 45 in FIG. 43.

Next, as shown in FIG. 33 and FIG. 34, the line (37) is inserted between the shape retaining core film (17) and the cover piece (41) and wired accordingly, by which the lure body (10) is prevented from frequent rubbing with the metal hook (36) to prevent damage at an early stage.

A ratio of the front head sides to the rear end sides in the entire length (L) of the lure body (10) has been described to the effect that the front head sides which are adhered in a bordered state occupy at least about ⅔ or more of the entire length (L), preferably about ⅗, while the rear end sides of the lure body (10) which are kept open occupy at most about ⅓ or less of the entire length (L), preferably about ⅖. However, as apparent from the partially modified embodiment in FIG. 35 corresponding to FIG. 28, it is acceptable that the front head sides from the virtual line (Z-Z) which connects the vicinity of the rear end at the dorsal fin part (12) with the vicinity of the intermediate site at the ventral fin part (13) in the lure body (10) occupy at least about ½ or more of the entire length (L) and are adhered in a bordered state, with the shape retaining core film (17) provided between them, and the rear end sides from the virtual line (Z-Z) also occupy at most about ½ or less of the entire length (L) and kept open in such a state that the shape retaining core film (17) is not provided between them. In this case as well, when used, the hook (36) is locked to the rear end (open edge) of the ventral joint face (16s) from the rear end side.

In brief, if the rear end sides of the lure body (10) which are kept open are set so as to occupy a greater area, elastic deformation of the lure body (10) as if a bait fish bends its body and swaying movement of the caudal fin part (15) are promoted. On the other hand, the front head sides which are adhered occupy a relatively smaller area, by which the lure body (10) is decreased in strength on assembly.

In contrast, if the front head sides which are adhered occupy a greater area, the lure body (10) is increased in strength on assembly. However, since the rear end sides which are kept open occupy a smaller area, the lure body (10) is decreased inelastic deformation and poor in swaying movement of the caudal fin part (15).

As a result, irrespective of the above described ratio, it is acceptable that a relative ratio of the front head sides to the rear end sides is set and adjusted appropriately depending on various conditions such as habits and territories of fish to be caught as well as species, configurations and behavior of bait fish for fish to be caught.

A reference numeral (42) indicates one or two rivets fixed by crimping the connection ring (38) of the line (37) in a folded state. A cover tube (43) made of a soft vinyl chloride resin, etc., to cover the rivet is inserted through the line (37).

Next, the cover tube (43) of the rivet (42) is to be locked into the line insertion hole (20) at the mouth part (11) of the lure body (10) when the lure (A) is suspended from the line (37) or the line (37) is pulled from the front. Thereby, a distance from the locked position to a position at which the root (front end) of the hook (36) is tied is made constant.

Therefore, the distance is set by adjusting the action distance (D) of the coupling band (40), by which a positional relationship can be adjusted in advance and set optimally so that the leading end of the hook (36) is partially expanded outside (below) from the lure body (10) and exposed. Further, the hook (36) and the lure (A) which are in the thus adjusted state are able to make a relative rotation freely with respect to the line (37) at 360 degrees.

Next, FIG. 36 to FIG. 45 show a preferred second embodiment of the present invention. Here, as apparent from FIG. 36 to FIG. 41 corresponding to FIG. 1 and FIG. 4 to FIG. 6, although the shape retaining core film (17) described in the first embodiment is not used, bilaterally symmetrical body-half segments (body hemi segments) (10L), (10R) of a lure body (10) are directly adhered integrally by using ketone (preferably acetone) or a colorless organic solvent or a colorless adhesive agent.

That is, front head sides from a virtual line (Z-Z) which connects the vicinity of a rear end at a dorsal fin part (12) with the vicinity of an intermediate site at an anal fin part (14) in the body-half segments (10L), (10R) are adhered in a state that dorsal joint faces (16b) and ventral joint faces (16s) are attached face to face. Thereby, the body-half segments are assembled into the lure body (10) which forms a substantially oval cross section, and rear end sides from the virtual line (Z-Z) are not adhered but kept open, thus realizing opening/closing movement in which a caudal fin part (15) thereof sways laterally.

Next, a shape retaining core tube (44) used in place of the shape retaining core film (17) of first embodiment is internally placed in the vicinity of a mouth part (11) of the lure body (10) in such a state as to be sandwiched laterally by the body-half segments (10L), (10R). Therefore, the shape retaining core tube (44) is injection-molded with a high-strength thermoplastic resin, preferably, transparent or translucent polycarbonate, polyacetal, fiber reinforced plastic (FRP) or the like into a tapered trapezoidal shape having a substantially oval cross section when viewed laterally and which corresponds to and aligns with an inner space from the mouth part (11) to a gill cover part (21) of the lure body (10) as shown in FIG. 37 and FIG. 38 and FIG. 41 and FIG. 42.

Further, a line insertion hole (45) corresponding to and aligning with a line insertion hole (20) of the lure body (10) and a circular rivet receiving port (46) which is greater in diameter are inserted and formed on a longitudinal center line (center line in a back-and-forth direction) of the mouth part shape retaining core tube (44) based on a relationship in the back and forth direction. A rivet (42) fixed by crimping a connection ring (38) of a line (37) is to be locked into the rivet receiving port (46). Accordingly, the hook (36) is not to be pulled forward from the mouth part (11) of the lure body (10).

The other configurations of a second embodiment in FIG. 36 to FIG. 45 are substantially the same as those of a first embodiment. Therefore, the same reference numerals as those in FIG. 1 to FIG. 35 are also referred to in FIG. 36 to FIG. 45, with a detailed description thereof omitted here.

The fish shaped lure (A) of the present invention is constituted, as described in the embodiment, to be an artificial bait appropriately used in trolling for tuna which is a typical large-size migrant fish. Therefore, the fish shaped lure can be used not only by fishermen on a fishing boat but also for special trolling in what is called sport fishing for leisure which uses a pleasure boat (cruiser), thereby offering an excellent fishing accomplishment for general anglers with enjoyment of leisure time.

FIG. 46 to FIG. 50 shows a state in which the present invention is used. When the fish shaped lure (A) (the configuration of sardine) is used to conduct trolling for tuna or fish to be caught, a line (37) equipped with hook (36) is guided out and wired in the front via the hollow interior of the front head from the rear end which is kept open in the lure body (10) and also through the line insertion hole (20) of the mouth part (11), and this line (37) is made available as an appropriately-long branch line (BL) which will be described later so as to be attached in a detachable manner on its way to a main line (ML) by using a snap opening/closing lock fitting (47) attached to the front end (root) thereof.

On the other hand, a highly elastic stick (48) (telescopic type stick in which 5 sections of rods are connected) which is made of fiber reinforced plastic (FRP) and capable of extending up to about 12 meters is attached and fixed to a cockpit deck, a flying deck or any other appropriate height on a vessel body (B) of a pleasure boat (cruiser) by setting to be about 7.35 meters in height (3-connected rod), for example. A receiver (51) of a boat rod (50) with a reel (49) attached is also attached and fixed at an appropriate position of the vessel body (B) near an angler (M1).

Next, a relatively short and fixed-length (for example, about 8 meters) tag line (TL) which is finally to sag down after a fish has been caught and the main line (ML) which is much longer and appropriately long (for example, about 100 meters) are carried away from an upper end (stick tip) of the stick (48) toward offshore (backward), and a resistance board (Jumbo Bird) (JB) is attached to the leading end (rear end) of the main line (ML).

Further, on its way to the main line (ML), a plurality of branch-line locking rings (52) (a total of 4 rings in this embodiment) are installed at appropriately relative intervals (for example, about 10 meters) in the back and forth direction. The snap opening/closing lock fitting (47) of the branch line (BL) is locked into each of the branch line locking rings (52) in a detachable manner as shown in the enlarged view of FIG. 47. Thereby, the fish shaped lure (A) is kept connected so as to be suspended downward from the main line (ML).

Figure 46:
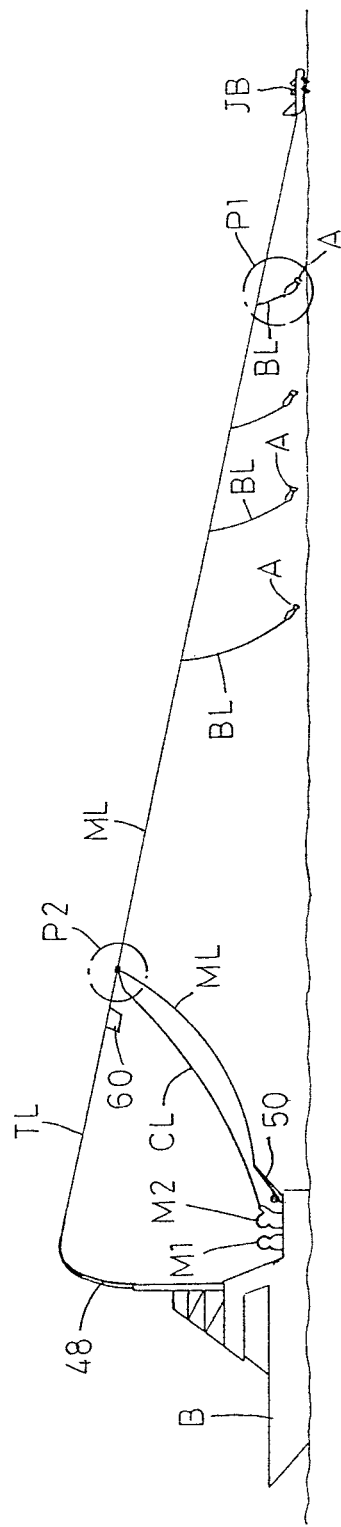
FIG. 46 is an overall schematic side view which explains trolling for tuna with the use of a lure.
Figure 47:
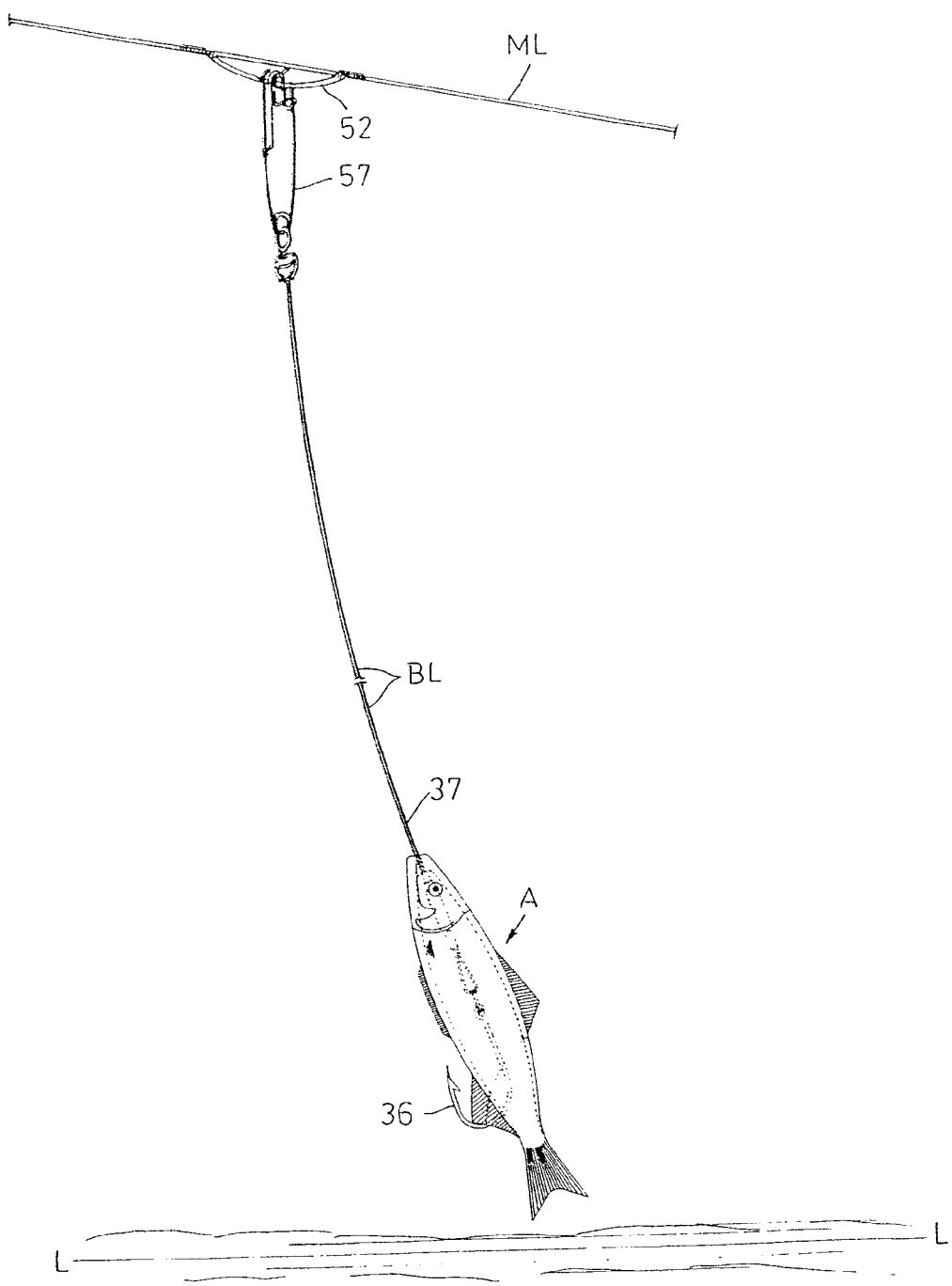
FIG. 47 shows an enlarged view extracted from a P1 part in FIG. 46.

In this case, as confirmed in the overall figure of FIG. 46, an action distance of the branch line (BL) which suspends the fish shaped lure (A) downward from the main line (ML) relatively changed the length by decreasing, for example, from about 3.5 meters-6.5 meters; about 3 meters-5 meters; about 2.5 meters-4.0 meters; to about 2.0 meters-2.5 meters sequentially in a step-wise manner, depending on what is called a backward-decreasing inclination angle of the main line (ML) extending from the upper end (stick tip) of the stick (48) toward offshore (backward). Thereby, all the plurality of lures (A) (a total of 4 lures in this embodiment) are adjusted for their positions and set so as to be equal in height to the surface of the water (L-L) on average or slightly higher so that the lures will float on the surface of the water (L-L) to some extent and kept in a state that the lures do not sink into the sea.

Figure 48:
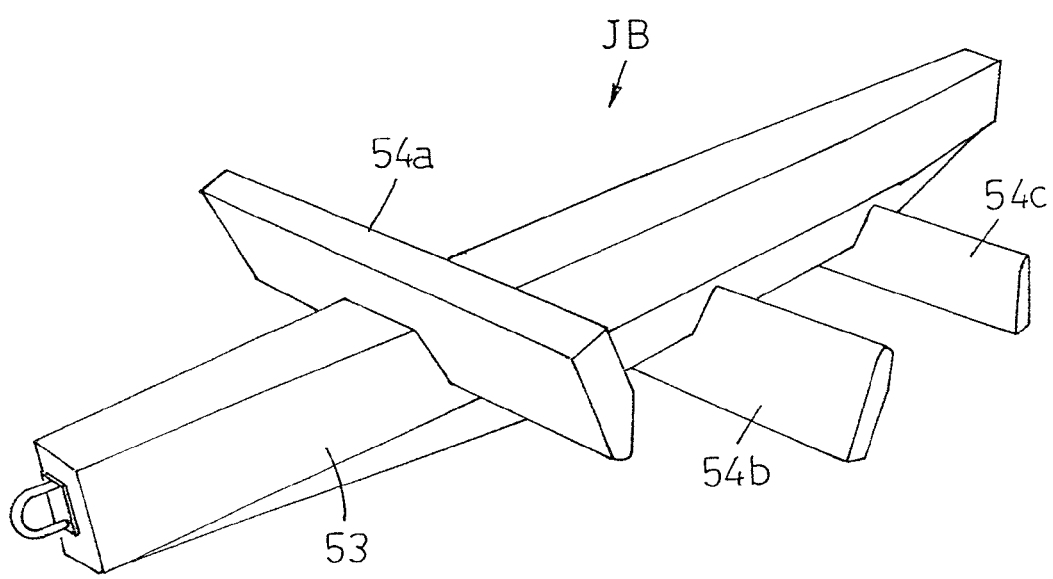
FIG. 48 shows an inclined view of a resistance board extracted from FIG. 46.
Figure 49:
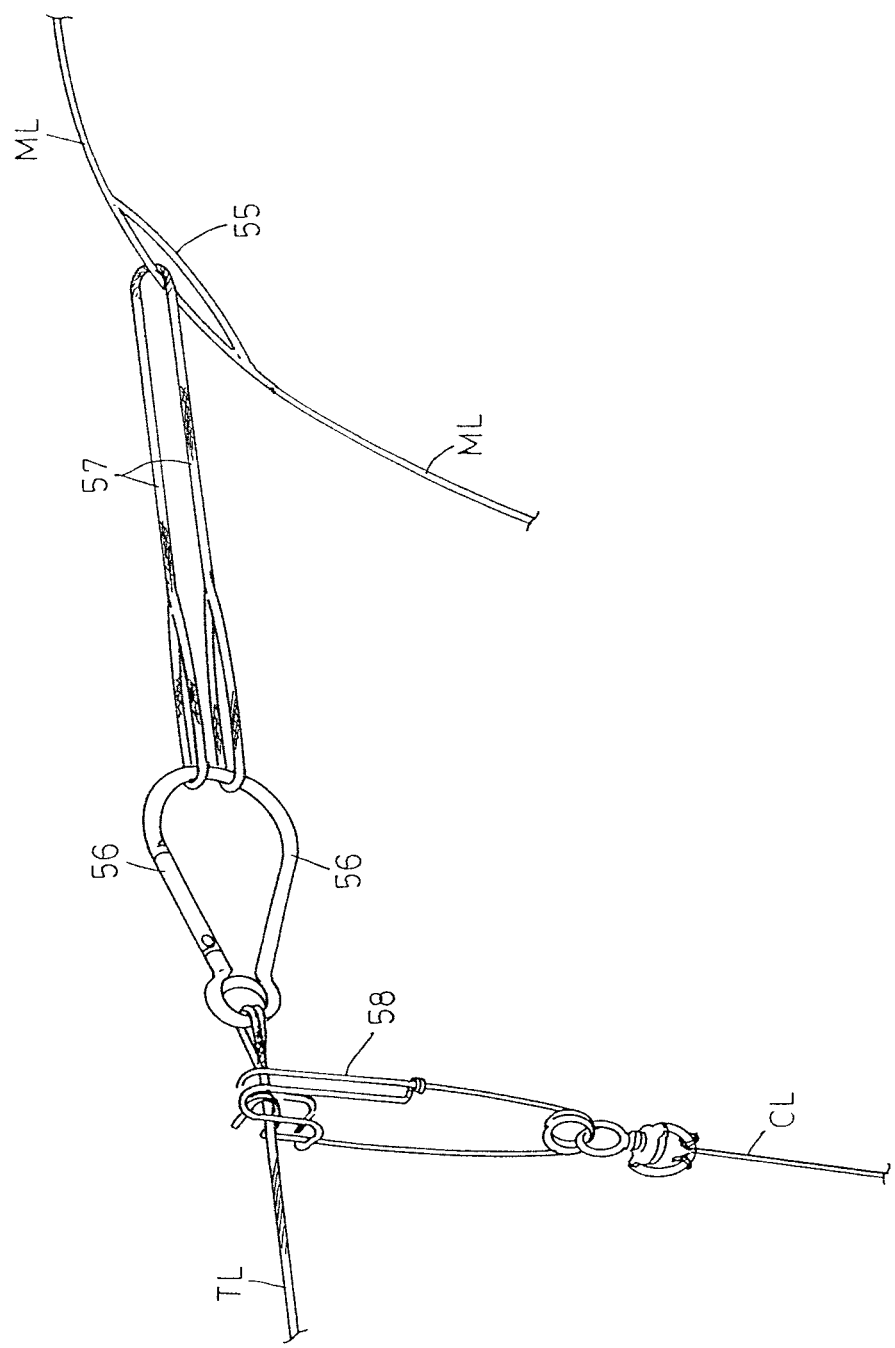
FIG. 49 shows an enlarged view that a P2 part in FIG. 46 is extracted.

The jumbo bird (JB) is made of fiber reinforced plastic (FRP) or polypropylene and assembled in such a manner that, as shown in FIG. 48, a trunk body (53) extending only by a certain length (for example, about 1,000 mm) in the back and forth direction is orthogonal to a plurality of wing boards (54a), (54b), (54c) arranged horizontally only by a certain length (for example about 300 mm) in the lateral direction. The jumbo bird (JB) is effective in tightening straight the tag line (TL) and the main line (ML) from the stick (48) by tensile resistance including its weight (for example, about 10 kg) but also effective in gathering fish by creating actions and sounds of vigorously splashing seawater by the wing boards (54a), (54b), (54c) and allowing a tuna to sense a school of bait fish (sardine) taken by the tuna. The jumbo bird (JB) is not a submerged board which is dragged in water.

However, the base (front end) of the main line (ML) is kept wound around the reel (49) attached to the boat rod (50) and designed to be carried away from the reel. A breaker locking ring (55) provided on its way to the main line (ML) is coupled in a detachable manner to a snap opening/closing hook (56) tied at the leading end (rear end) of the tag line (TL) via a breaker (57) which is preferably composed of a biodegradable resin-made braided rope, as shown by an extraction of FIG. 49.

When the main line (ML) is pulled strongly from the leading end (rear end) thereof due to movement of a tuna which bites the lure (A) of the branch line (BL), the breaker (57) provided on its way is broken off and automatically changed from an existing wiring system coupled to the tag line (TL) to a wiring system which is to be reeled by the reel (49) of the boat rod (50).

Further, a symbol (CL) indicates an auxiliary control line (action line) which is connected in a detachable manner near the leading end (rear end) of the tag line (TL). The lower end of the auxiliary control line (CL) sagging down from the tag line (TL) to the vessel body (B) is operated by being pulled or released by what is called an assistant (M2) to the angler (M1) on the vessel body (B), thereby giving assistance in manually raising or lowering the fish shaped lure (A). A reference numeral (58) indicates a snap opening/closing lock fitting which is tied at the upper end of the auxiliary control line (CL) and the same as the lock fitting (47) of the branch line (BL).

Figure 50:
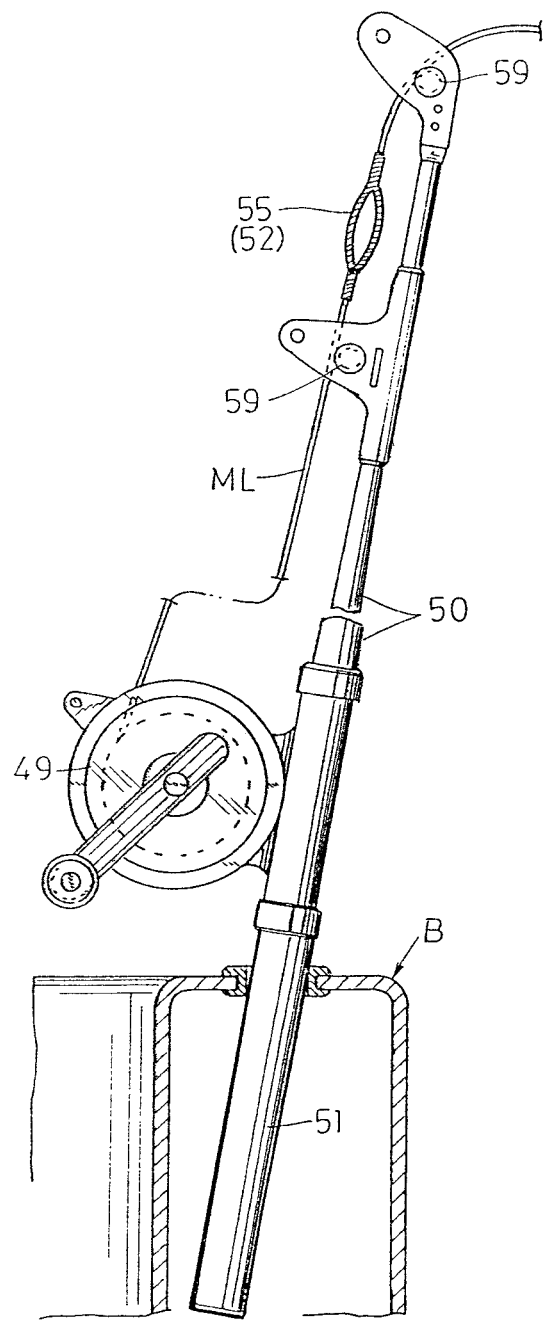
FIG. 50 is an enlarged view which shows that a boat rod supporting part on a vessel body is extracted from FIG. 46.

As shown in FIG. 50, the boat rod (50) to which the reel (49) of the main line (ML) is to be set so as to be inserted into a receiver (51) is fixed and installed on the vessel body (B) in a detachable manner. A reference numeral (59) indicates a plurality of main-line guide fittings installed on the boat rod (50), through which the main line (ML) having the branch line locking ring (52) and the breaker locking ring (55) can be inserted smoothly and easily.

It is preferable that the above described flexible rope made of high-strength polyethylene fiber (trade name of "Dyneema") is adopted as the main line (ML), the tag line (TL) and the auxiliary control line (CL), while a nylon thread is adopted as the branch line (BL).

First, as apparent from numerical values of length and others which are shown as references, the above described trolling is performed in a vast area. It is, therefore, desirable that a flag (60) as a mark for notifying other boats of fishing operation in progress is attached on the tag line (TL) to secure the safety.

After the tag line (TL), the breaker (57), the main line (ML) and the jumbo bird (JB) are completely aligned straight in sequential order from the stick (48) as described above, the vessel body (B) of the pleasure boat (cruiser) is allowed to run at an appropriate speed (for example, about 5 to 8 knots) to drag the jumbo bird (JB), thus making a difference in tensile force on the main line (ML) due to the influence of wave resistance. This difference is alleviated by repulsion of the elastic stick (48), thereby quickly tightening the main line (ML) which has been loosened.

Further, when the vessel body (B) runs for operation, it causes bounding, rolling and pitching, and the upper end of the stick (48) sways in lateral and back-and-forth directions. The fish shaped lures (A) are suspended downward in parallel via the plurality of branch lines (BL) from the main line (ML), splashing the surface of the water (L-L) and jumping and hopping (floating up and down from the surface of the water) upon receiving waves or flying over the surface of the water (L-L) like flying fish, and these actions are repeated. The bait searching instinct of tuna or fish to be caught is greatly stimulated by these complicated and random actions together with sounds and light in association therewith. The bait searching instinct of tuna is also strongly stimulated by seawater vigorously splashed during dragging of the jumbo bird (JB) and sounds associated therewith. The actions contribute to fish gathering effects.

Further, the hollow body (10) of the lure (A) made of a transparent or translucent flexible thermoplastic resin, and transfer sheets (28L), (28R) each of which has the image (picture) (29) identical or similar to an external appearance of a bait fish (sardine) are adhered integrally on a convex curved face on the back side (inner side) of the lure body (10). Therefore, light that shines in all directions on the convex curved surface on the surface side (outside) of the lure body (10) also provides the tuna with the movement of the bait fish (sardine). This is helpful in improving fish gathering effects.

In particular, each of the transfer sheets (28L), (28R) adhered to the back side (inner face) of each of the body-half segments (10L), (10R) of the lure body (10) is made up of the hologram sheet (28) and the image (29) multi-colored on the surface thereof. Therefore, together with light reflection of the metal reflection layer (32) which constitutes the hologram sheet (28), the image (29) viewed perspectively and observed in a mixed state with the hologram image from the surface side (outside) of the lure body (10) forms an external appearance which resembles a bait fish (sardine) with glisten and shimmer scales.

Further, the lure body (10) is a hollow product made of a flexible thermoplastic resin and designed to mimic elastic deformation that a bait fish (sardine) is swimming, with the body bent, and swaying movement of the caudal fin part (15). As a result, the actions of the lure body (10) are associated with those of the bait fish (sardine), thereby offering an excellent fishing accomplishment.

In this case, the auxiliary control line (CL) sagging down from the tag line (TL) to the vessel body (B) is operated by being pulled or released by the assistant (M2) to the angler (M1) or others, thus making it possible to control manually the movement of the lure (A) by actively raising or lowering the lure.

Next, the lure (A) is suspended downward from the main line (ML) via the branch line (BL) at a height substantially similar to the surface of the water (L-L) on average or floating from the surface of the water (L-L) to some extent. Thus, tuna which is a large-size migrant fish will gather around the surface of the water (surface layer) (L-L) upon receipt of the above fish gathering actions, jumping out from the water (below) and biting in particular the rear end side of the lure (A). In some cases, the entire lure (A) is swallowed by the tuna.

At this time, the above described elastic stick (48) is bent and deformed rapidly like a bow from the upper end (stick tip) and also undergoes restorative deformation depending on loads thereof. Thus, there is no fear that the stick gives a strong shock to the tuna, and a temporal difference produced according to the elastic deformation prevent the tuna from escaping from the hook or cutting its mouth.

Further, the body (10) of the lure (A) is a hollow product made of a flexible thermoplastic resin and the rear end side of the lure body (10) which is in particular easy for tuna to bite is made thin and flat gradually from the front head side. Thus, there is no fear of providing tuna with a different sense from a bait fish (sardine) and this is effective in preventing escape from the hook. Moreover, since the hook (36) is installed at the rear end side of the lure body (10), it is possible to reliably hold the tuna with the hook (36) in combination with restoration and repulsion of the stick (48).

Next, the tuna which has been held by the hook (36) of the lure (A) is to pull the line (branch line) (37). Thereby, the rear end side of the lure (A) is bitten off by the tuna to leave the front head side or the lure (A) is not bitten off but left in its entirety. In either case, such lure (A) moves along the line (branch line) (37) to the front site at which the main line (ML) is present, as if being drawn away from the hook (36). It is, thus, possible to reduce resistance of the lure (A) against the tuna and damage to the lure (A) as much as possible.

Further, upon receipt of strong pulling strength of the tuna which has bitten the lure (A), the breaker (57) coupled with the stick (48) on its way to the main line (ML) is cut off, and while the tag line (TL) sags down from the upper end of the stick (48), the main line (ML) is changed to a wiring system continuing to the reel (49) of the boat rod (50). Therefore, an angler (M1) rotationally operates the reel (49) of the main line (ML) so that the tuna comes close to the vessel body (B) and brings it into the vessel body (B) by using a gaff or the like. Regarding the line (branch line) (37) of the lure (A) at which no tuna has bitten, it is acceptable that the lock fitting (47) is removed from the main line (ML).

In the long line fishing described previously in Japanese Published Unexamined Patent Application No. 2009-278953, the lure (artificial bait) is sunk into the sea by using a weight.

Further, in conventional trolling, a fishing pole is brought out horizontally in the lateral direction from a fishing boat and lures suspended downward from the fishing pole are kept sunk into the sea by using a submerged board and dragged accordingly. Therefore, in any types of the long line fishing, the lures move monotonously and do not change in a complicated and irregular manner. Moreover, sounds and the shimmering in association with the movement are less likely to take place, thus resulting in poor effects of gathering fish to be caught and also a poor fishing accomplishment.

In contrast, where trolling is carried out by using the fish shaped lure (A) of the present invention, the surface of the water (surface layer) is given in what is called a fishing place of migrant fish, the lure (A) jumps and hops on the surface of the water (L-L) with actions of the elastic stick (48) and the jumbo bird (JB), flies like flying fish and repeats complicated and random movement of small fish such as escaping in combination with sounds and the shimmering in association with the actions. It is, thereby, possible to stimulate greatly the bait searching instinct of the fish to be caught (tuna) and also to obtain fish gathering effects and an excellent fishing accomplishment.

A bait fish for fish to be caught is different depending on various conditions such as species of the fish to be caught, territories, fishing seasons, weather and places. Even the same type of the fish to be caught may be different in a bait fish to be taken, depending on the learning effect of individual fish to be caught and the territory thereof.

In this respect, regarding the fish shaped lure (A) of the present invention, a manufacturer is able to exchange the transfer sheets (28L), (28R) adhered to the back sides (inner faces) of the body-half segments (10L), (10R) for those only different in the image (29), thereby assembling conveniently the pair of bilaterally symmetrical body-half segments (10L), (10R) into the lure body (10). This is effective in abundantly providing the fish shaped lures (A) having various images (29).

In the embodiment shown here, since tuna is a fish to be caught, the body (10) of the lure (A) in itself is made into the fish shape of a sardine to be taken by the tuna. However, as long as the lure is made into a relatively small-size bait fish which is for fish to be caught, it is acceptable that the lure is made so as to resemble the configuration of mackerel or other fish. Squid and octopus which do not resemble the fish shape thereof are not included in the present invention, although they may be for fish to be caught.

What is claimed is:

1. A fish shaped lure for trolling comprising:
  a pair of bilaterally symmetrical body-half segments molded into a configuration of a bait fish for fish to be caught, each one of the body-half segments having a cross section in a shape of a segment of an ellipse, by using a flexible thermoplastic resin that is one of either transparent or translucent; and
  a pair of symmetrical transfer sheets, each one transfer sheet of the pair of transfer sheets having an image identical or similar to an external appearance of the bait fish, said each one transfer sheet including a hologram sheet having a hologram color-printed on a hologram forming face of the hologram sheet, said image being substantially similar to a corresponding one of the pair of the body-half segment in terms of dimension and configuration; wherein
  each one transfer sheet of the pair of transfer sheets is adhered to a corresponding back side of the corresponding body-half segment to provide a first portion of an integrated body of the fish shaped lure by using a colorless organic solvent or a colorless adhesive agent so that the image can be viewed perspectively as a hologram from a surface side of each of the body-half segments,
  while only front head sides of both the body-half segments which occupy at least half a fish shape are adhered face to face to provide a second portion of the integrated body by the fusion action of a plasticizer of each of a pair of flat back side joint surfaces that continuously border along a back surface of the bait fish configuration and a pair of flat ventral side joint surfaces that continuously border along a ventral surface of the bait fish configuration, or by using the colorless organic solvent or the colorless adhesive agent and assembled into a hollow lure body having a substantially oval cross section,
  a rear end side of each one of the body-half segments occupies at most half of a remaining fish shape and is not adhered but kept open, so that said rear end side can swing freely in the left-right direction, and
  a line having a leading end to which a hook is attached, the hook being latched to the rear end side of the ventral side joint surfaces of the lure body from the rear tail side, so that only the sharp front end of the hook partially extends out of the lure body,
  the line extending from within the lure body from the leading end out of the lure body through a mouth part of a front head side.

2. The fish shaped lure for trolling according to claim 1, wherein a shape retaining core film which is uniform in thickness and molded with a flexible thermoplastic resin so as to be substantially similar in dimension and configuration to the front hard sides of both the body-half segments, the shape retaining core film being set so as to be inserted between only the front head sides of both the body-half segments, each one of the body-half segments occupying at least half the bait fish configuration, and
  wherein each one of the body-half segments is adhered to the shape retaining core film at only the front head sides of the body-half segments to provide a second portion of the integrated body in a bordered state by fusion of plasticizers of both flat back side joint surfaces that continuously border along the back surface of the bait fish configuration and both flat ventral side joint surfaces that continuously border along the ventral surface of the bait fish configuration, so as to include the shape retaining core film in the integrated body while the body-half segments are adhered to the shape retaining core film.

3. The fish shaped lure for trolling according to claim 1, wherein a mouth part shape retaining core tube is molded with a high-strength thermoplastic resin,
  wherein the retaining core tube extends axially from a mouth end of the fish shaped lure, has a substantially oval transverse cross section, and has a tapered trapezoidal shaped coronal cross section, and
  wherein the retaining core tube is configured to be inserted and fitted near the mouth part of bait fish configuration in both the body-half segments, and
  wherein the retaining core tube is inserted and set only near the mouth part of the bait fish configuration;
  wherein only the front head sides of the body-half segments are adhered, said front head sides being adhered by fusion of plasticizers of said both flat side joint surfaces that continuously border along the back side of the bait fish configuration, so as to sandwich the shape retaining core film.

4. The fish shaped lure for trolling according to claim 1, wherein both the body-half segments which are assembled into said lure body are molded so that mutually facing cross sections are made substantially semi-oval in the shape of a segment of an ellipse, wherein a distance from the mouth part of the bait fish configuration on body-half segments to the vicinity of a rear end of a dorsal fin part is provided as a dorsal joint face which forms a border continuously along a flat edge of a dorsal face, wherein a distance from the mouth part of the fish shape to the vicinity of an intermediate site of a ventral fin part or a distance from the mouth part of the fish shape to the vicinity of an intermediate site of an anal fin part is provided as a ventral joint face which forms a border continuously along a flat edge of a ventral face, and wherein the dorsal joint faces and the ventral joint faces of both the body-half segments are adhered by the colorless organic solvent or the adhesive agent to provide an integrated body' having both faces attached directly face to face via a shape retaining core film made of a soft vinyl chloride resin, said both faces being attached face to face by fusion of plasticizers within said soft vinyl chloride resin.

5. The fish shaped lure for trolling according to claim 1, wherein the front head side is one of two front head sides where both flat back side joint surfaces and both flat ventral side joint surfaces of the body-half segments of the lure body are adhered in a bordered state are made greater in average thickness, and the rear end sides where they are not adhered but kept open are made thinner in average thickness, thereby giving a difference in average thickness between them.

6. The fish shaped lure for trolling according to claim 1, wherein the hologram sheet of each of the transfer sheets is provided as a laminated body made of a paper substrate sheet for printing, a hologram forming resin sheet and a metal reflection layer which is fused or vapor-deposited on a hologram forming face thereof, thereby a realistic image of a bait fish is color-printed on the surface of the metal reflection layer by offset printing, and after the transfer sheets have been adhered to the back sides of the body-half segments with the colorless organic solvent or the colorless adhesive agent to give the integrated body but before assembly of the body-half segments into the lure body, only the paper substrate sheet of the hologram sheet of the transfer sheet is removed.

7. The fish shaped lure for trolling according to claim 1, wherein the front head side of a portion connecting the rear end of a dorsal fin part to an intermediate part of an anal fin part in both body-half segments is proportioned to take up approximately ⅗ of a total length of the lure body;

wherein both flat back side joint surfaces are adhered together and both flat ventral side joint surfaces are adhered together; and wherein a rear tail side of said portion taking up a remaining ⅖ of the total length of the lure body is not adhered allowing the tail fin part to swing freely in a left-right direction and to open and close.

8. A fish shaped lure for trolling comprising:

a pair of bilaterally symmetrical body-half segments molded into a configuration of a bait fish for fish to be caught, each one of the body-half segments having a cross section in a shape of a segment of an ellipse, by using a flexible thermoplastic resin that is one of either transparent or translucent; and a pair of symmetrical transfer sheets, each one transfer sheet of the pair of transfer sheets having an image identical or similar to an external appearance of the bait fish, said each one transfer sheet including a hologram sheet having a hologram color-printed on a hologram forming face of the hologram sheet, said image being substantially similar to a corresponding one of the pair of the body-half segments in terms of dimension and configuration;

wherein each one transfer sheet of the pair of transfer sheets is adhered to a corresponding back side of the corresponding body-half segment to provide an integrated body by using a colorless organic solvent or a colorless adhesive agent that the image can be viewed perspectively as a hologram image from a surface side of each of the body-half segments;

wherein only front head sides of both the body-half segments which occupy at least half a fish shape are adhered face to face to provide said integrated body by the fusion action of a plasticizer of both flat back side joint surfaces that continuously borders along the back surface of the fish shape and both flat ventral side joint surfaces that continuously borders along the ventral surface of the fish shape, or by using the colorless organic solvent or the colorless adhesive agent and assembled into a hollow lure body having a substantially oval cross section in a shape of a segment of an ellipse;

wherein a rear end side of each one of the body-half segments occupies at most half of a remaining fish shape and is not adhered but kept open, so that said rear end side can swing freely in the left-right direction;

wherein a line is provided having a leading end to which a hook is attached, the hook being latched to the rear end-side of the ventral side joint surfaces of the lure body from the rear tail side, so that only the sharp front end of the hook partially extends out of the lure body;

wherein the line extends from within the lure body from the leading end out of the lure body through a mouth part of a front head side;

wherein a mouth part shape retaining core tube is molded with a high-strength thermoplastic resin;

wherein the retaining core tube extends axially from a mouth end of the fish shaped lure, has a substantially oval transverse cross section, and has a tapered trapezoidal shaped coronal cross section;

wherein the retaining core tube is configured to be inserted and fitted near the mouth part of the bait fish configuration in both the body-half segments; and wherein the retaining core tube is inserted and set only near the mouth part of the fish configuration in both the body-half segments, thereby both the body-half segments are adhered to give an integrated body in a bordered state by using the colorless organic solvent or the adhesive agent.

9. A fish shaped lure for trolling comprising: a pair of bilaterally symmetrical body-half segments molded into a configuration of a bait fish for fish to be caught, each one of the body-half segments having a cross section in a shape of an arc length of an oval, by using a flexible thermoplastic resin that is one of either transparent or translucent; and a pair of symmetrical transfer sheets, each one transfer sheet of the pair of transfer sheets having an image identical or similar to an external appearance of the bait fish, said each one transfer sheet including a hologram sheet having a hologram color-printed on a hologram forming face of the hologram sheet, said image being-substantially similar to a corresponding one of the pair of the body-half segments in terms of dimension and configuration;

wherein each one transfer sheet of the pair of transfer sheets is adhered to a corresponding back side of the corresponding body-half segment to provide an integrated body by using a colorless organic solvent or a colorless adhesive agent in that the image can be viewed perspectively with as a hologram image from a surface side of each of the body-half segments;

wherein only front head sides of both the body-half segments which occupy at least half a fish shape are adhered face to face to provide said integrated body by the fusion action of a plasticizer of both fiat back side joint surfaces that continuously borders along the back surface of the fish shape and both fiat ventral side joint surfaces that continuously borders along the ventral surface of the fish shape, or by using the colorless organic solvent or the colorless adhesive agent and assembled into a hollow lure body having a substantially oval cross section;

wherein a rear end side of each one of the body-half segments occupies at most half of a remaining fish shape and is not adhered but kept open, so that said rear end side can swing freely in the left-right direction;

wherein a line is provided having a leading end to which a hook is attached, the hook being latched to the rear end side of the ventral side joint surfaces of the lure body from the rear tail side, so that only the sharp front end of the hook partially extends out of the lure body;

wherein the line extends from within the lure body from the leading end out of the lure body through a mouth pail of a front head side;

wherein both the body-half segments which are to be assembled into said lure body are molded so that mutually facing cross sections are made substantially semioval;

wherein a distance from the mouth part of the fish shape to a vicinity of a rear end of a dorsal fin part is provided as a dorsal joint face which forms a border continuously along the edge of a dorsal face;

wherein a distance from the mouth part of the fish shape to a vicinity of an intermediate site of a ventral fin part or a distance from the mouth part of the fish shape to a vicinity of an intermediate site of an anal fin part is provided as a ventral joint face which forms a border continuously along the edge of a ventral face; and wherein the dorsal joint faces and the ventral joint faces of both the body-half segments are adhered by the colorless organic solvent or the colorless adhesive agent to provide an integrated body having both faces attached face to face via a shape retaining core film made of a soft vinyl chloride resin, said both faces being attached face to face by fusion of plasticizers within said soft vinyl chloride resin.

10. A fish shaped lure for trolling comprising:

a pair of bilaterally symmetrical body-half segments molded into a configuration of a bait fish for fish to be caught, each one of the body-half segments having a cross section in a shape of a segment of an ellipse, by using a flexible thermoplastic resin that is one of either transparent or translucent; and a pair of symmetrical transfer sheets, each one transfer sheet of the pair of transfer sheets having an image identical or similar to an external appearance of the bait fish, said each one transfer sheet including a hologram sheet having a hologram color-printed on a hologram forming face of the hologram sheet, said image being substantially similar to a corresponding one of the pair of the body-half segments in terms of dimension and configuration;

wherein each one transfer sheet of the pair of transfer sheets is adhered to a corresponding back side of the corresponding body-half segment to provide an integrated body by using a colorless organic solvent or a colorless adhesive agent that the image can be viewed perspectively as a hologram from a surface side of each of the body-half segments;

wherein only front head sides of both the body-half segments which occupy at least half a fish shape are adhered face to face to provide said integrated body by the fusion action of a plasticizer of both fiat back side joint surfaces that continuously borders along the back surface of the fish shape and both flat ventral side joint surfaces that continuously borders along the ventral surface of the fish shape, or by using the colorless organic solvent or the colorless adhesive agent and assembled into a hollow lure body having a substantially oval cross section;

wherein a rear end side of each one of the body-half segments occupies at most half of a remaining Fish shape and is not adhered but kept open, so that said rear end side can swing freely in the left-right direction;

wherein a line is provided having a leading end to which a hook is attached, the hook being latched to the rear end side of the ventral side joint surfaces of the lure body from the rear tail side, so that only the sharp front end of the hook partially extends out of the lure body;

wherein the line extends from within the lure body from the leading end out of the lure body through a mouth part of a front head side; and wherein the front head sides where the body-half segments of the lure body are adhered in a bordered state are made greater in average thickness, and the rear end sides where they are not adhered but kept open are made thinner in average thickness, thereby giving a difference in average thickness between them.

11. A fish shaped lure for trolling comprising: a pair of bilaterally symmetrical body-half segments molded into a configuration of a bait fish for fish to be caught, each one of the body-half segments having a cross section in a shape of segment of an ellipse, by using a flexible thermoplastic resin that is one of either transparent or translucent; and a pair of symmetrical transfer sheets, each one transfer sheet of the pair of transfer sheets having an image identical or similar to an external appearance of the bait fish, said each one transfer sheet including a hologram sheet having a hologram color-printed on a hologram forming face of the hologram sheet, said image being substantially similar to a corresponding one of the pair of the body-half segments in terms of dimension and configuration;

wherein each one transfer sheet of the pair of transfer sheets is adhered to a corresponding back side of the corresponding body-half segment to provide an integrated body by using a colorless organic solvent or a colorless adhesive agent that the image can be viewed perspectively as a hologram from a surface side of each of the body-half segments;

wherein only front head sides of both the body-half segments which occupy at least half a fish shape are adhered face to face to provide said integrated body by the fusion action of a plasticizer of both fiat back side joint surfaces that continuously borders along the back surface of the fish shape and both flat ventral side joint surfaces that continuously borders along the ventral surface of the fish shape, or by using the colorless organic solvent or the colorless adhesive agent and assembled into a hollow lure body having a substantially oval cross section;

wherein a rear end side of each one of the body-half segments occupies at most half of a remaining fish shape and is not adhered but kept open, so that said rear end side can swing freely in the left-right direction;

wherein a line is provided having a leading end to which a hook is attached, the hook being-latched to the rear end side of the ventral side joint surfaces of the lure body from the rear tail side, so that only the sharp front end of the hook partially extends out of the lure body;

wherein the line extends from within the lure body from the leading end out of the lure body through a mouth part of a front head side;

wherein the hologram sheet of each of the transfer sheets is provided as a laminated body made of a paper substrate sheet, a hologram forming resin sheet and a metal reflection layer which is fused or vapor-deposited on a hologram forming face thereof, thereby, said image of said bait fish is color-printed on the surface of the metal reflection layer by offset printing, and wherein after the transfer sheets have been adhered to the back sides of the body-half segments to provide the integrated body but before assembly of the body-half segments into the lure body, only the paper substrate sheet of the hologram sheet of the transfer sheet is removed.

\* \* \* \* \*